United States Patent [19]
Curry et al.

[11] Patent Number: 5,506,991
[45] Date of Patent: Apr. 9, 1996

[54] PRINTER PORT ADAPTER WITH OVERLAID ONE-WIRE INTERFACE FOR ELECTRONIC KEY

[75] Inventors: Stephen M. Curry; Michael L. Bolan, both of Dallas; William L. Payne, II, Garland; Kevin E. Deierling; Guenter H. Lehmann, both of Dallas, all of Tex.

[73] Assignee: Dallas Semiconductor Corporation, Dallas, Tex.

[21] Appl. No.: 631,929

[22] Filed: Dec. 19, 1990

Related U.S. Application Data

[63] Continuation-in-part of Ser. No. 352,581, May 15, 1989, Pat. No. 5,210,846, Ser. No. 351,759, May 15, 1989, Pat. No. 4,982,371, Ser. No. 351,760, May 15, 1989, Pat. No. 5,091,771, Ser. No. 351,998, May 15, 1989, Pat. No. 4,972,377, Ser. No. 352,598, May 15, 1989, Pat. No. 4,945,217, Ser. No. 352,596, May 15, 1989, Pat. No. 4,948,954, Ser. No. 351,999, May 15, 1989, Pat. No. 5,045,675, Ser. No. 352,142, May 15, 1989, Pat. No. 4,995,004, and Ser. No. 351,997, May 15, 1989, abandoned.

[51] Int. Cl.$^6$ .................................................. G06F 13/00
[52] U.S. Cl. ................... 395/800; 364/229.5; 364/238.5; 364/286.5; 364/DIG. 1
[58] Field of Search ..................................... 395/101, 800, 395/325

[56] References Cited

U.S. PATENT DOCUMENTS

| | | | |
|---|---|---|---|
| 3,502,905 | 3/1970 | Bicking | 307/570 |
| 3,846,971 | 11/1974 | Ho et al. | 368/88 |
| 3,986,051 | 10/1976 | Okada et al. | 307/296.1 |
| 3,996,735 | 12/1976 | Zurcher | 368/88 |
| 4,007,355 | 2/1977 | Moreno | 235/492 |
| 4,028,682 | 6/1977 | Weber et al. | |
| 4,040,026 | 8/1977 | Gernelle | |
| 4,052,702 | 10/1977 | Smith et al. | 395/275 |
| 4,053,688 | 10/1977 | Perkins et al. | 368/88 |
| 4,064,689 | 12/1977 | Yasuda et al. | 368/88 |
| 4,086,752 | 5/1978 | Kishimoto | 368/88 |
| 4,196,577 | 4/1980 | Ohno et al. | 368/82 |
| 4,211,919 | 7/1980 | Ugon | 235/488 |
| 4,217,637 | 8/1980 | Faulkner et al. | |
| 4,241,418 | 12/1980 | Stanley | |
| 4,272,838 | 6/1981 | Kasama et al. | 368/88 |
| 4,295,220 | 10/1981 | Blum et al. | |
| 4,337,525 | 6/1982 | Akatsuka | |
| 4,396,985 | 8/1983 | Ohara | |
| 4,426,159 | 1/1984 | Kosaka et al. | 368/88 |
| 4,472,215 | 5/1984 | Daughters et al. | 235/487 |
| 4,480,178 | 10/1984 | Miller et al. | 235/380 |
| 4,509,120 | 4/1985 | Daudelin | |
| 4,556,958 | 11/1985 | Ugon | 235/492 X |
| 4,556,959 | 12/1985 | Ugon | 395/575 |
| 4,558,435 | 12/1985 | Hsieh | |
| 4,616,343 | 10/1986 | Ogawa | 365/203 |
| 4,617,473 | 10/1986 | Bingham | 365/229 |
| 4,618,857 | 10/1986 | Dubois et al. | 307/66 |
| 4,621,190 | 11/1986 | Saito et al. | 235/492 |
| 4,683,372 | 7/1987 | Matsumoto | 235/492 |
| 4,709,202 | 11/1987 | Koenck et al. | 340/636 |
| 4,717,817 | 1/1988 | Grass | 235/441 |
| 4,780,707 | 10/1988 | Selker | 235/472 |

(List continued on next page.)

FOREIGN PATENT DOCUMENTS 52-67674  6/1977  Japan.

OTHER PUBLICATIONS

Dallas Semiconductor Printer Pont Keying DS1255, p. 326.

Primary Examiner—Parshotam S. Lall
Assistant Examiner—Ayni Mohamed
Attorney, Agent, or Firm—Jenkens & Gilchrist

[57] ABSTRACT

A printer port adapter which permits electronic keys to be accessed through the printer port of the PC, without disrupting the normal operation of the printer port in any mode of operation whatsoever. The electronic keys used have a one-wire signal interface, and this interface can be inserted into the full standard ISA printer port pin assignment, as well as the all known nonstandard additional assignments which have been overlaid onto the standard printer port.

45 Claims, 18 Drawing Sheets

U.S. PATENT DOCUMENTS

| | | | |
|---|---|---|---|
| 4,800,590 | 1/1989 | Vaughan | 380/25 |
| 4,810,975 | 3/1989 | Dias | 331/78 |
| 4,845,609 | 7/1989 | Lighthurt et al. | 395/425 |
| 4,855,690 | 8/1989 | Dias | 331/78 |
| 4,862,501 | 9/1989 | Kamitake et al. | 380/50 |
| 4,868,409 | 9/1989 | Tanaka et al. | 70/278 |
| 4,870,401 | 9/1989 | Lee et al. | 340/825.31 |
| 4,882,474 | 11/1989 | Anderl et al. | 235/492 |
| 4,885,788 | 12/1989 | Takaragi et al. | 380/23 |
| 4,887,234 | 12/1989 | Iijima | 395/425 |
| 4,887,292 | 12/1989 | Barrett et al. | 379/103 |
| 4,908,790 | 3/1990 | Little et al. | 365/229 |
| 4,928,001 | 5/1990 | Masada | 235/380 |
| 4,947,163 | 8/1990 | Henderson et al. | 340/825.31 |
| 4,982,371 | 1/1991 | Bolan et al. | 365/228 |
| 4,988,987 | 1/1991 | Barrett et al. | 340/825.31 |
| 5,010,331 | 4/1991 | Dias et al. | 340/825.31 |
| 5,013,898 | 5/1991 | Glasspool | 235/449 |
| 5,038,299 | 8/1991 | Maeda | 364/519 |
| 5,045,675 | 9/1991 | Curry | 235/441 |

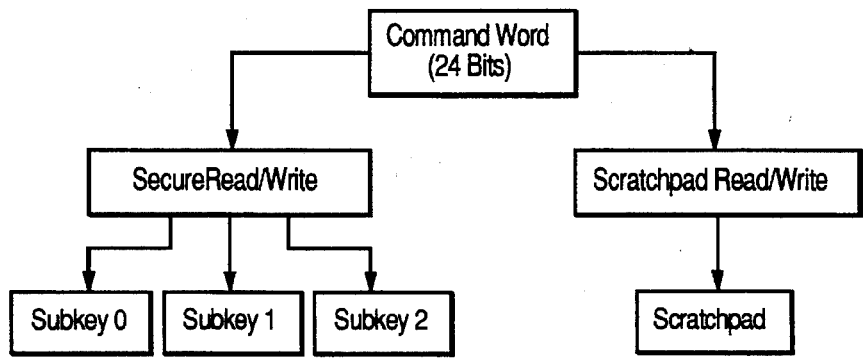
Fig.1
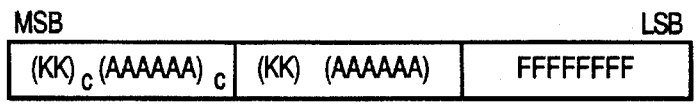
Fig.2
| VALID COMMAND CODE FFFF FFFF | VALID COMMAND CODE FFFF FFFF | VALID COMMAND CODE FFFF FFFF | VALID COMMAND CODE FFFF FFFF |
|---|---|---|---|
| Set Scratchpad | 11 | 0–63 | 1001 0110 |
| Get Scratchpad | 11 | 0–63 | 0110 1001 |
| Set Secure Data | 00,01,10 | 16–23 | 1001 1001 |
| Get Secure Data | 00,01,10 | 16–23 | 0110 0110 |
| Set Password | 00,01,10 | 000000 | 0101 1010 |
| Move Block | 00,01,10 | 000000 | 0011 1100 |
Fig.3
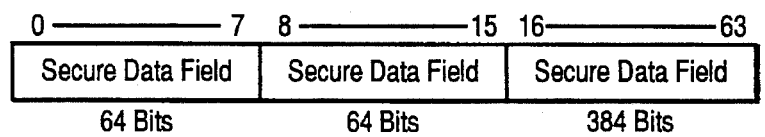
Fig.4

| Block Number | Byte Address in: Scratchpad | Subkey |
|---|---|---|
| 0 | 0-7 | 0-7 (ID) |
| 1 | 8-15 | 8-15 (PASSWORD) |
| 2 | 16-23 | 16-23 (PASSWORD) |
| 3 | 24-31 | 24-31 (SECURED) |
| 4 | 32-39 | 32-39 (SECURED) |
| 5 | 40-47 | 40-47 (SECURED) |
| 6 | 48-55 | 48-55 (SECURED) |
| 7 | 56-63 | 56-63 (SECURED) |

| Block# | Selector Code |
|---|---|
| 0 | 4C69 6E64 9DB3 9A9A (H) |
| 1 | 4C69 919B 624C 9A9A (H) |
| 2 | 4C69 6E9B 62B3 659A (H) |
| 3 | 4366 616B 6D43 6A6A (H) |
| 4 | BC99 9E94 92BC 9595 (H) |
| 5 | B369 9164 9D4C 9A65 (H) |
| 6 | B396 6E64 90B3 6565 (H) |
| 7 | B396 919B 624C 6565 (H) |
| All Blocks | 7FFA 5D57 517F 5656 (H) |

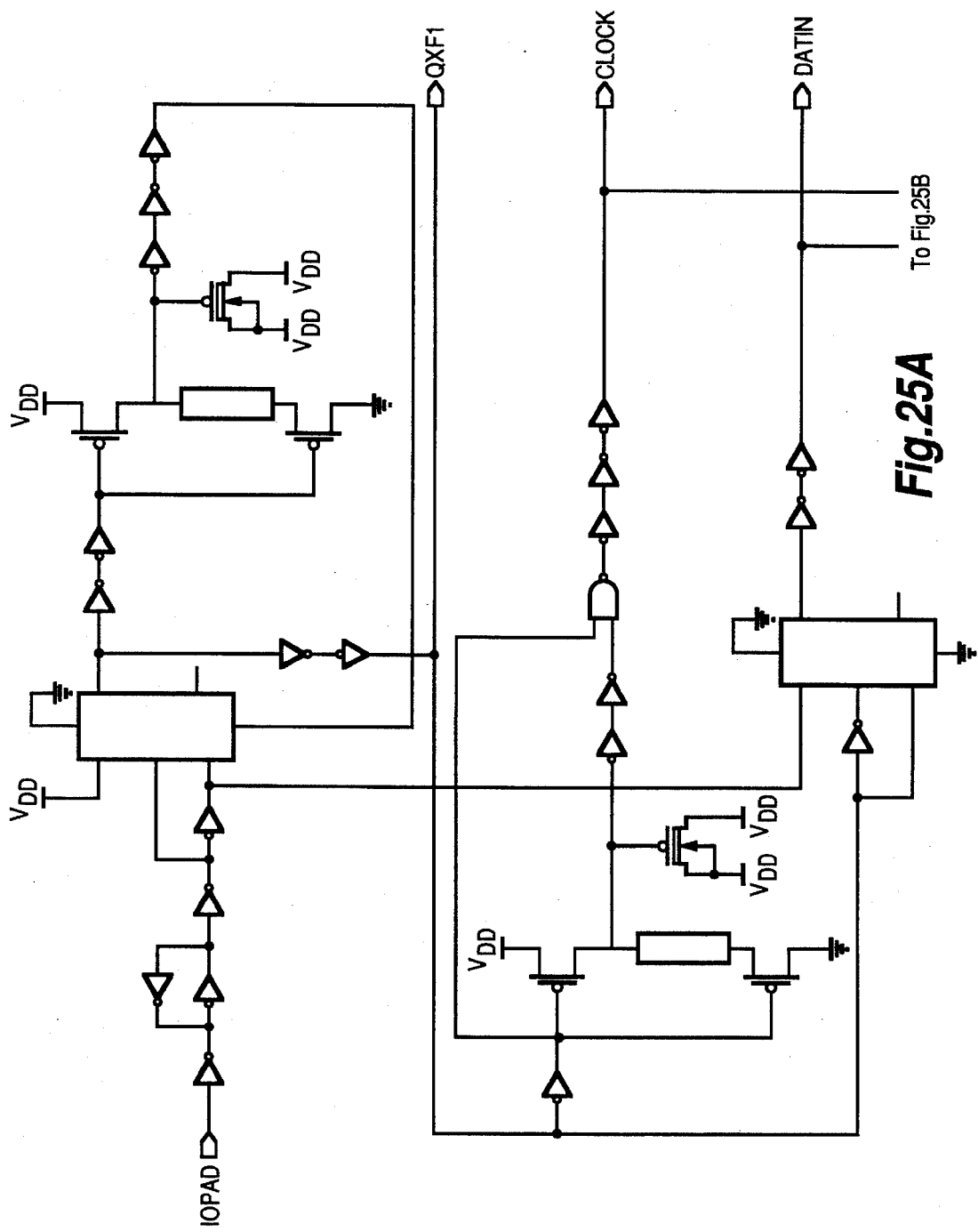

PRINTER PORT ADAPTER WITH OVERLAID ONE-WIRE INTERFACE FOR ELECTRONIC KEY

CROSS-REFERENCE TO OTHER APPLICATIONS

The present application is a continuation-in-part application, claiming priority from the following commonly-owned U.S. applications, all filed on May 15, 1989, and all hereby incorporated by reference: Ser. No. 352,581, "One-Wire Bus Architecture" (DSC-83) now U.S. Pat. No. 5,210,846; Ser. No. 351,759, "Compact Electronic Module" (DSC-85) now U.S. Pat. No. 4,982,371; Ser. No. 351,760, "Compact Package for Electronic Module" (DSC-86) now U.S. Pat. No. 5,091,771; Ser. No. 351,998, "Low-voltage Low-power Static RAM" (DSC-107) now U.S. Pat. No. 4,972,377; Ser. No. 352,598, "Hand-held Wand for Reading Electronic Tokens" (DSC-157) now U.S. Pat. No. 4,945,217; Ser. No. 352,596, "Interface for Receiving Electronic Tokens" (DSC-158) now U.S. Pat. No. 4,948,954; Ser. No. 351,999, "Serial Port Interface to Low-voltage Low-power Data Module" (DSC-159) now U.S. Pat. No. 5,045,675; Ser. No. 352,142, "RAM/ROM Hybrid Memory Architecture" (DSC-160) now U.S. Pat. No. 4,995,004; and Ser. No. 351,997, "Modular Data System" (DSC-161) now abandoned.

The present appplication also claims priority from PCT application PCT/US90/02891, filed 5/15/90 and designating the United States (DSC-83PCT), which is hereby incorporated by reference.

The present application also claims priority from the following applications, which is hereby incorporated by reference: Ser. No. 615,606, Filed 11/19/90 (DSC-303)now U.S. Pat. No. 5,206,905; Ser. No. 615,615, Filed 11/19/90 (DSC-304) now abandoned; Ser. No. 615,608, Filed 11/19/90 (DSC-305) now U.S. Pat. No. 5,226,137; and Ser. No. 615,618, Filed 11/19/90 (DSC-306) now abandoned.

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND OF THE INVENTION

The present invention relates to electronic keys, and particularly to electronic keys which can interface readily to a personal computer.

An electronic key is a circuit which performs the function of a key, using stored information instead of shaped metal In order to fulfill this function, an electronic key should preferably provide two kinds of concealment: the data in the key's secure memory should be concealed, and the password which permits access to the key's secure memory should also be concealed.

Electronic keys are used primarily to provide access to secure electronic data upon receipt of a valid password and to prohibit such access if an invalid password is received. One such application is the use of an electronic key hardware module in conjunction with commercially available software. The electronic key module is attached to the computer operating the software in a manner to allow the software to access the electronic key, and the software is programmed with an algorithm to verify that the module is attached to the computer. Thus, while the software is easily copied, the electronic key hardware module is not; and the software cannot, therefore, be simultaneously used in several computers.

An electronic key may have to withstand harsh environments (such as users' pockets), and is therefore normally housed in a compact package with a high degree of physical robustness.

This creates some difficulty in software copy-protection applications: how is the electronic key to be connected to the end-user's computer? Many accessories (such as mouses, modem, and joysticks) use the two serial ports of a standard PC, and therefore it is not practical to take over a serial port. If an electronic key adapter could be inserted into the standard printer port, this would be most advantageous; but there are hidden difficulties in implementing this, as will now be described.

The 1985–1986 Product Data Book of Dallas Semiconductor, which is hereby incorporated by reference, contained preliminary descriptions of a DS1201 Electronic Tag, a DS1204 Electronic Key, and a DS1250 Electronic keyring. The DS1204 was an important early development in electronic keys, and required 5 connections (for a 3-wire serial interface, plus power and ground). The DS1250, as described in this databook, was an expansion adapter, which was a jumper to be inserted in a memory chip socket. When a specific address sequence was detected, this jumper would then divert certain bits of the ensuing data to one of the electronic key sockets.

The 1987 Product Data Book of Dallas Semiconductor, which is hereby incorporated by reference, contained more definitive descriptions of the DS1201 Electronic Tag and the DS1204 Electronic Key (now designated as a DS1204U). This data book also described a DS1253 Printer Port keyring. The DS1253 key ring was another expansion adapter, which was a jumper to be inserted into the printer port of a PC, between the computer and its printer. This adapter contained sockets for connection of multiple 5-pin electronic keys (such as the DS1201, the DS1204U, or the then new DS1207, which also contained timekeeping circuitry).

The datasheet for the DS1253 keyring stated that the adaptation would cause no disruption of the interface between computer and printer. Unfortunately, although this scheme worked perfectly well with the standard printer port, many printer and computer manufacturers had inserted nonstandard features to take advantage of the "waste space" in the pin definitions of the standard printer port. In fact, by 1990 so many nonstandard pin definitions have appeared that there is no room for a standard serial interface to be sandwiched in while retaining compatibility with all of the various widespread hardware types.

The 1987–1988 Product Data Book of Dallas Semiconductor, which is hereby incorporated by reference, introduced a preliminary data sheet for yet another electronic key adaptor, the DS1255 Printer Port keyring. The DS1255 keyring was electrically similar to the DS1253 key ring, but was housed in a different physical housing, with a more compact form factor. This housing did not include a ribbon cable (like the DS1250 and DS1253); instead, it provided a single housing with 5-pin keyports on either side.

SUMMARY OF THE INVENTION

The present application sets forth a new and more convenient way to connect an electronic key to a personal computer.

A male-female jumper adapter is used to interpose an electronic key interface into a personal computer's printer port. The adapter of the preferred embodiment is externally similar to the DS1255 keyring described above, but the electrical interface is different.

The electrical interface exploits the novel one-wire bus definition, described in Ser. No. 352,581 (DSC-83) now U.S. Pat. No. 5,210,846 and in other parent applications cited above. This interface is slower than a three-wire serial interface, but has the great advantage that it can be sandwiched into the standard printer port without disrupting printer function in any respect.

BRIEF DESCRIPTION OF THE DRAWINGS

The present invention will be described with reference to the accompanying drawings, which show important sample embodiments of the invention and which are incorporated in the specification hereof by reference, wherein:

FIG. 1 schematically shows the writing of a command word to the electronic key chip of the presently preferred embodiment.

FIG. 2 shows the field organization of the 24-bit command word, in the presently preferred embodiment.

FIG. 3 illustrates the subkey codes used in the presently preferred embodiment.

FIG. 4 shows the data organization of the multiple subkeys of the electronic key chip of the presently preferred embodiment.

FIGS. 25A and 25B are two parts of a single Figure which shows the one-wire-to-three-wire conversion circuit used, in the presently preferred embodiment, in the integrated circuit of FIG. 20.

DESCRIPTION OF THE PREFERRED EMBODIMENTS

The electronic key used in the presently preferred embodiment will first be described in great detail, and then the adapter and its connections which advantageously permit one or more keys of this type to be addressed through the printer port will be described.

Overall Description of the Electronic Key Embodiment

The DS1205 MultiKey is an enhanced version of the DS1204U Electronic Key which has both a standard 3-wire interface, data, clock, and reset, and a 1-wire "touch" interface. The DS1205 MultiKey has three secure read/write subkeys which are each 384 bits in length. In addition, there is a 512-bit read/write scratchpad which can be used as a non-secure data area or as a holding register for data transfer to one of the three subkeys. Each subkey within the part is uniquely addressable.

Operation

The writing of a command word to the DS1205 MultiKey specifies the operation to be performed and the subkey to be operated on. There are two classes of operations available for the DS1205 MultiKey. These are operations which access one of the three secure read/write subkeys and operations which access the read/write scratchpad (FIG. 1).

Command Word

The 24-bit command word is grouped into three fields of eight bits each. These byte-sized fields specify the subkey which is to be accessed, the starting byte address for the data transfer operation, and the type of command to be performed. The starting byte address and the subkey identifier fields are required to be given in both true and complement form. If these values do not match, the access to the part will be terminated (FIG. 2).

The first byte of the command word is made up of the complement of the 2-bit subkey code, identifying which subkey is being accessed, and the complement of the 6-bit address field, which specifies the starting byte address of the given subkey to be accessed. The second byte of the command word consists of the 2-bit subkey code and the 6-bit starting byte address. The third byte of the command word is the 8-bit function code which defines which of the six commands is to be executed. Each command is subkey- and address-specific and, as such, each command precludes the use of certain subkey codes and starting address locations. FIG. 3 illustrates the subkey codes, starting address locations, and function codes that are valid for each of the six command operations.

Secure Subkey Commands

Each secure subkey within the DS1205 MultiKey is comprised of a 64-bit ID field, a 64-bit password field, and a 384-bit secured data field (FIG. 4). The three commands which operate on the secure subkeys are as follows:

1) Set password
2) Set secure data
3) Get secure data

Set Password

Figure 5:
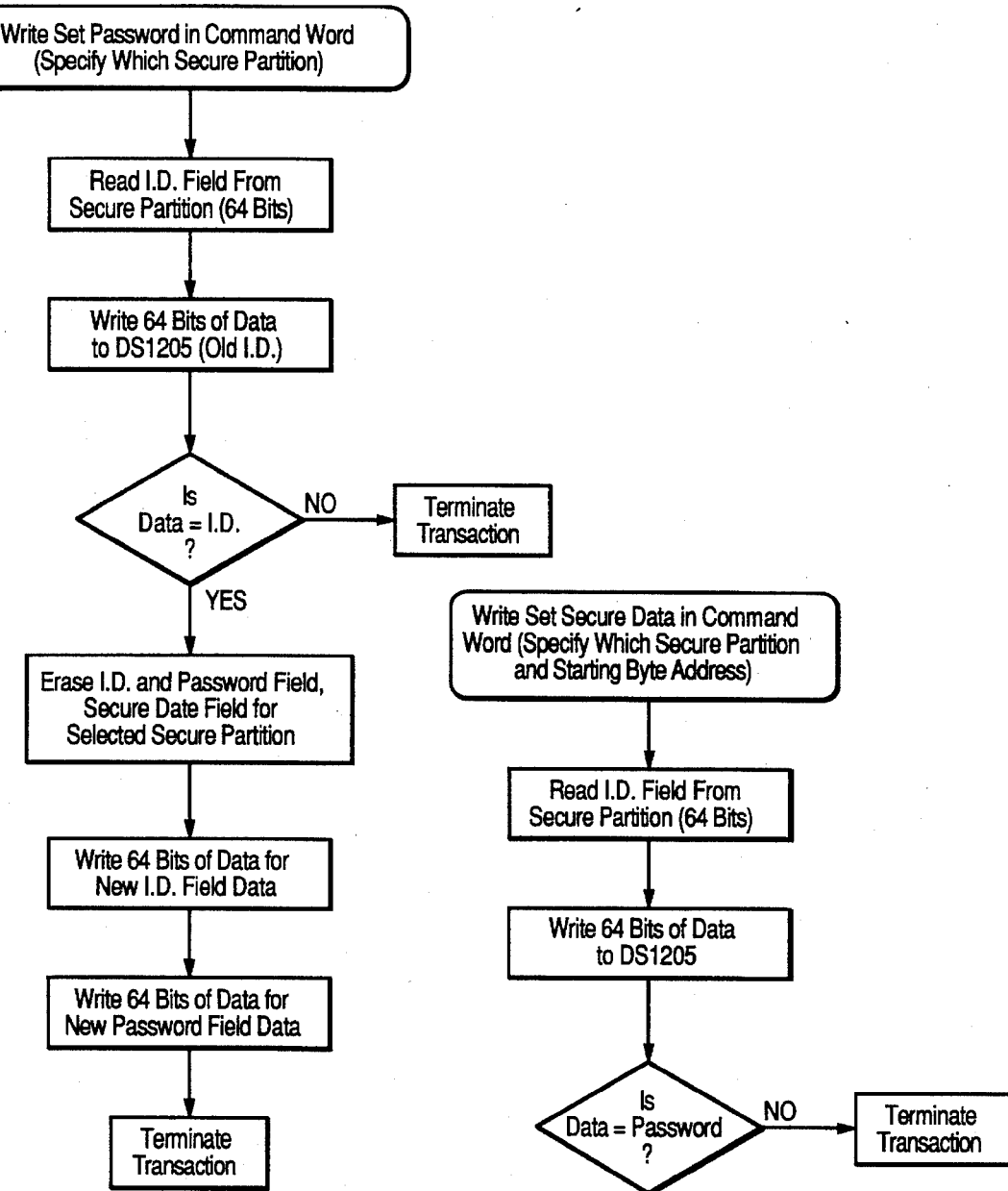
FIG. 5 shows the sequence of operations when a Set Password command is received, in the electronic key chip of the presently preferred embodiment.

The Set Password command is used to enter data into the I.D. field and the password field of the selected subkey. Upon recognition of the correct I.D., the DS1205 MultiKey will erase the entire contents of the selected subkey and proceed to rewrite the 64-bit I.D. field and the 64-bit password field. The flow sequence is shown in FIG. 5.

Set Secure Data

Figure 6:
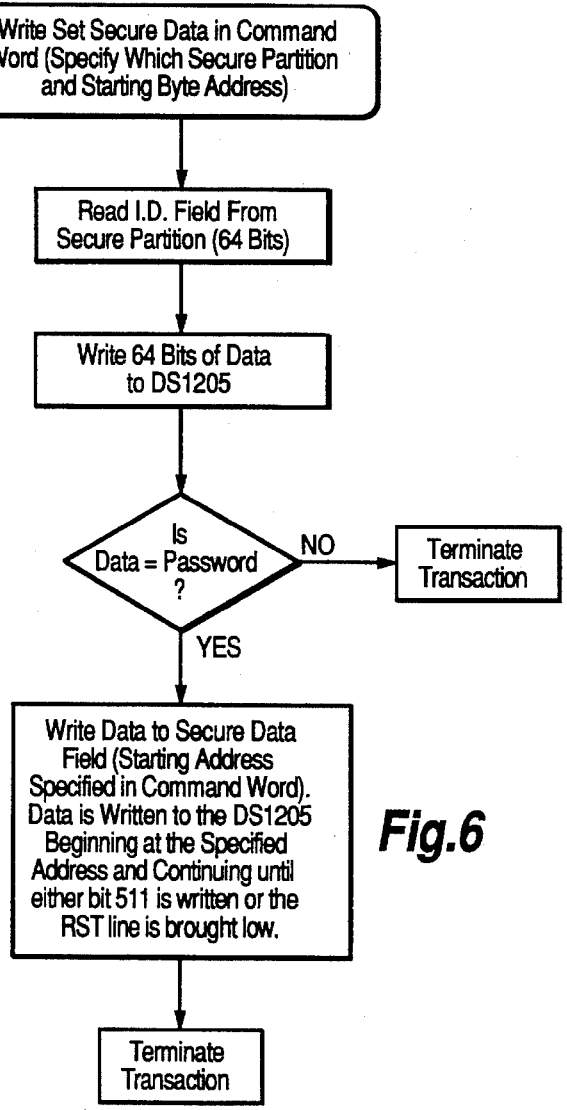
FIG. 6 shows the sequence of operations when a Set Secure Data command is received, in the electronic key chip of the presently preferred embodiment.

The Set Secure Data command is used to enter data into the selected subkey. The first 64 bits of the data stream will be a read of the I.D. field from the selected subkey. The next 64 bits of the data stream must contain the password for the selected subkey. If the received password does not match the password field for the selected subkey, the DS1205 Multi-Key will terminate the transaction immediately. The flow sequence is shown in FIG. 6.

Get Secure Data

Figure 7:
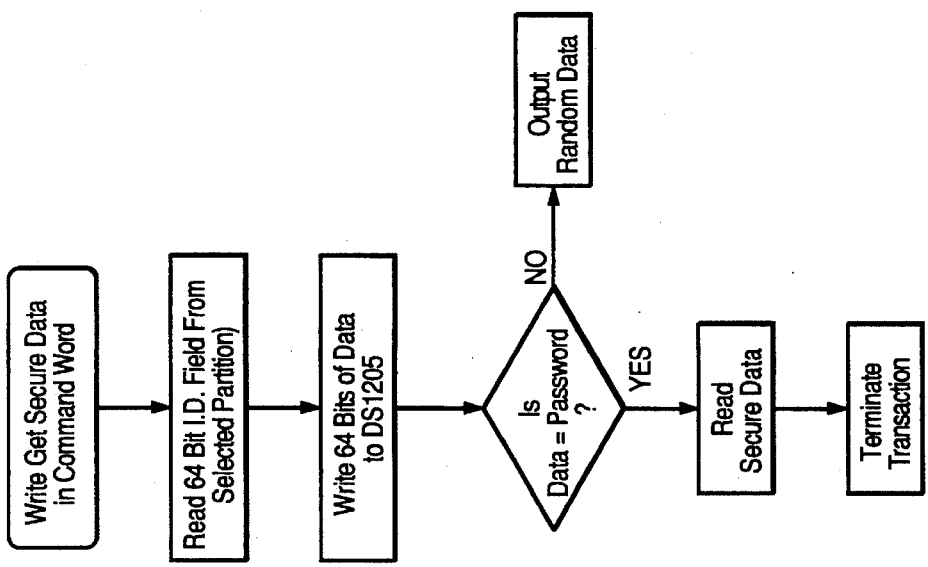
FIG. 7 shows the sequence of operations when a Get Secure Data command is received, in the electronic key chip of the presently preferred embodiment.

The Get Secure Data command is used to retrieve secured data from the selected subkey. The 64-bit I.D. field of the selected subkey must be read by the host. The password for the selected subkey must then be transmitted to the DS1205 MultiKey immediately after the command word. If the received password fails to match the password field for the selected subkey, the DS1205 MultiKey will output randomly generated data instead of the secured data. The flow sequence is shown in FIG. 7.

Scratchpad Read/Write Commands

The 512-bit Read/Write Scratchpad of the DS1205 MultiKey is not password-protected and is accessible beginning at any byte boundary. The scratchpad can be used to store unsecured data or it can be used to build up a data structure which can be verified and then transferred to a secure subkey. The three commands which operate on the read/write scratchpad are as follows:

1) Set scratchpad data
2) Get scratchpad data
3) Move block

Set Scratchpad Data

Figure 8:
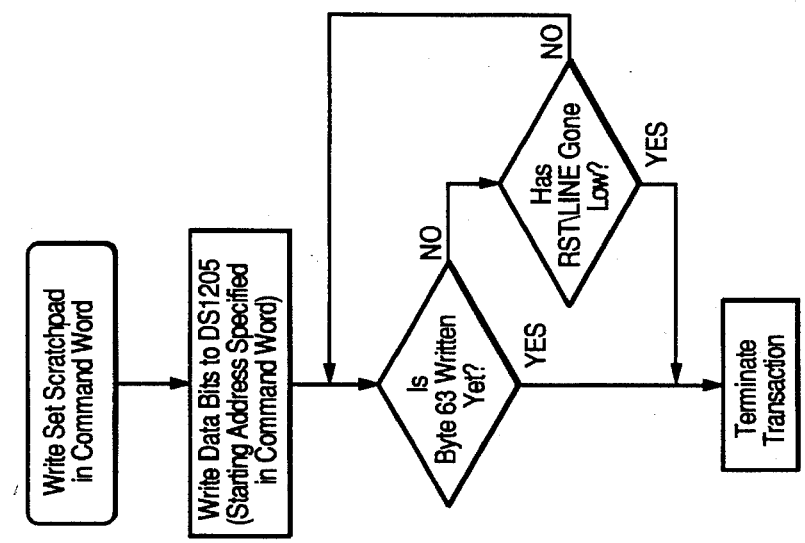
FIG. 8 shows the sequence of operations when a Set Scratchpad Data command is received, in the electronic key chip of the presently preferred embodiment.

The Set Scratchpad Data command is used to enter data into the DS1205 MultiKey scratchpad. The command word must specify the starting byte address for the data transfer. Valid byte addresses are 0 through 63. The DS1205 MultiKey will write data to the scratchpad until byte 63 has been written or until the RST\ line goes to a logic low level. The flow sequence is shown in FIG. 8.

Get Scratchpad Data

Figure 9:
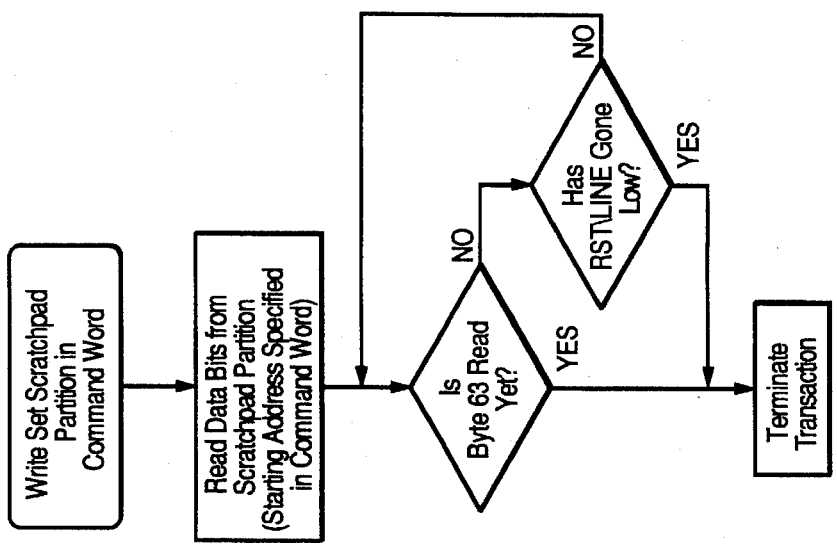
FIG. 9 shows the sequence of operations when a Get Scratchpad Data command is received, in the electronic key chip of the presently preferred embodiment.

The Get Scratchpad data command is used to retrieve data from the 512-bit scratchpad. The command word must specify the starting byte address for the data retrieval. Valid byte addresses are 0 through 63. The DS1205 MultiKey will retrieve data from the scratchpad until byte 63 has been read or the RST\ line goes to a logic low level. The flow sequence is shown in FIG. 9.

Move Block

Figures 10, 11, 12:
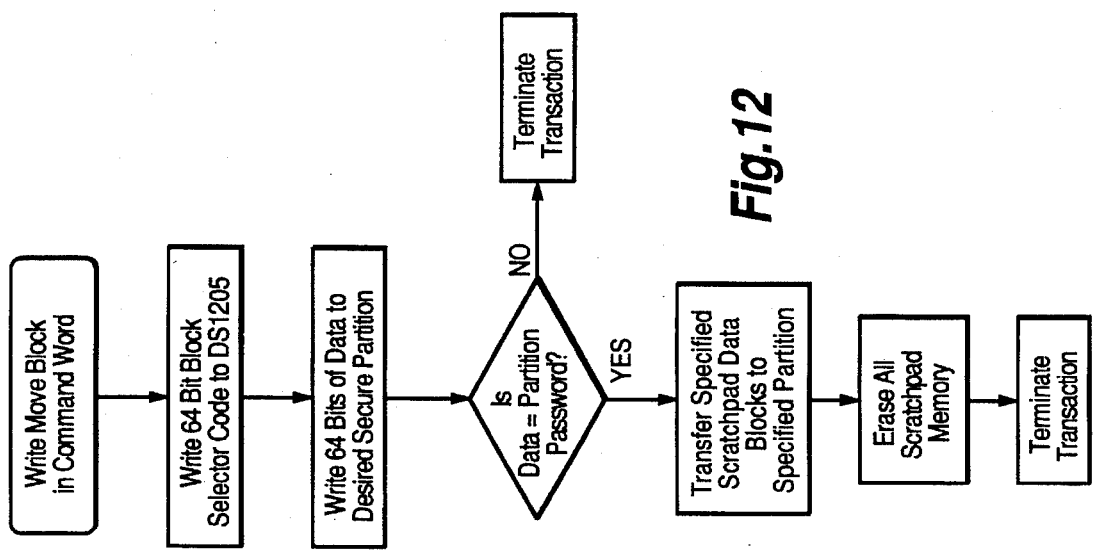
FIGS. 10–12 show the format and significance of a Move Block command, in the electronic key chip of the presently preferred embodiment.

The Move Block command is used to transfer data, which has been previously entered into the scratchpad and verified, to one of the three secure subkeys. Data can be transferred as one large block of 512 bits or it can be transferred in blocks of 64 bits each (FIG. 10). There are nine valid block selectors which are used to specify which block or blocks are to be transferred (FIG. 11). As a further precaution against accidental erasure of a secure subkey, the 64-bit password of the destination subkey must be entered and match the destination subkey. If the passwords fail to match, the operation is terminated. The flow sequence is shown in FIG. 12.

1-wire Interface

When the "touch" interface is used, all communications to and from the DS1205 MultiKey are accomplished via a single interface lead. Data is read and written through the use of time slots to manipulate bits and a command word to specify the transaction.

Write Time Slots

A write time slot is initiated when the host pulls the data line from a high logic level to a low logic level. There are two types of write time slots: Write One time slots and Write Zero time slots. All write time slots must be a minimum of 60 uS and a maximum of 120 uS in duration. There is a minimum of a 1 uS valid access recovery time between time slots.

Figure 13:
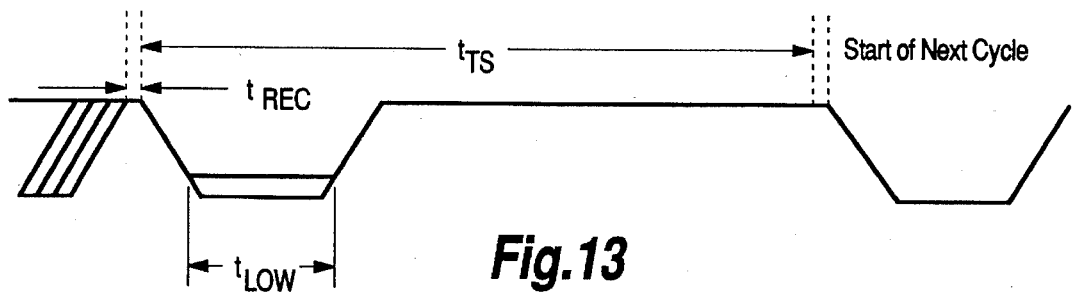
FIG. 13 shows the timing of a Write One time slot on the one-wire bus, in the presently preferred embodiment.

For the host to generate a Write One time slot, the data line must be pulled to a logic low level and then released, allowing the data line to pull up to a high level within 15 uS after the start of the write time slot (see FIG. 13).

Figure 14:
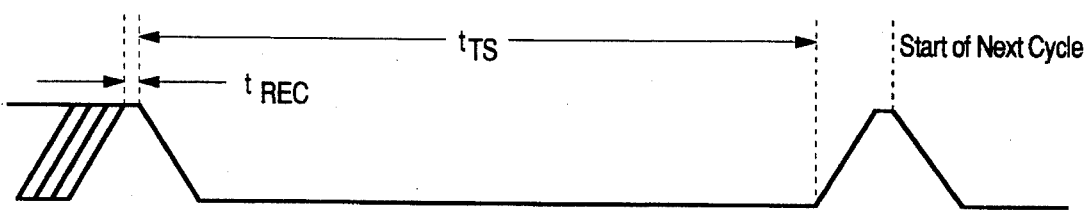
FIG. 14 shows the timing of a Write Zero time slot on the one-wire bus, in the presently preferred embodiment.

For the host to generate a Write Zero time slot, the data line must be pulled to a logic low level and remain low for the duration of the write time slot (see FIG. 14).

Read Time Slots

Figure 15:
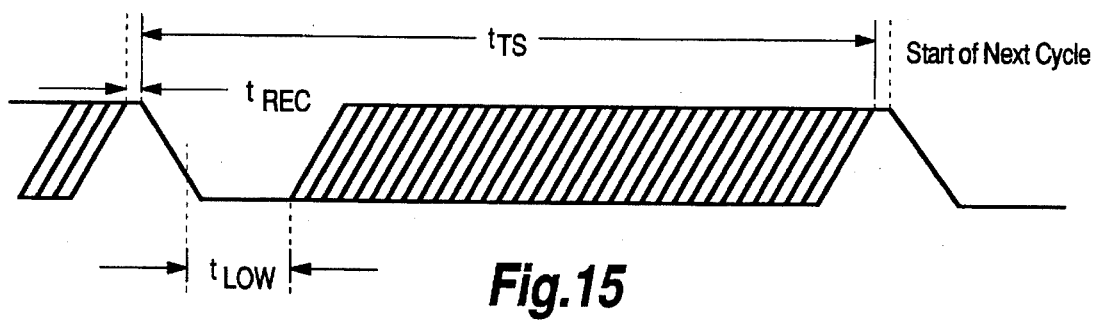
FIG. 15 shows the timing of a Read time slot on the one-wire bus, in the presently preferred embodiment.

The host generates read time slots when data is to be read from the 1-wire interface. A read time slot is initiated when the host pulls the data line from a logic high level to a logic low level. The data line must remain at a low logic level for a minimum of 1 uS and a maximum of 15 uS. This maximum time of 15 uS includes the time required for the data line to pull up to a high level after it is released. The state of the 1-wire data line must be read by the host within 15 uS after the start of the read time slot. After this time, the state of the data is not guaranteed (see FIG. 15). All read time slots must be a minimum of 60 uS in duration with a minimum of a 1 uS valid access recovery time between individual read time slots.

1-wire Protocol

The 1-wire protocol can be viewed as having three distinct layers. These layers are the Presence Detect layer, the Reset layer, and the Command layer.

Presence Detect

Figure 16:
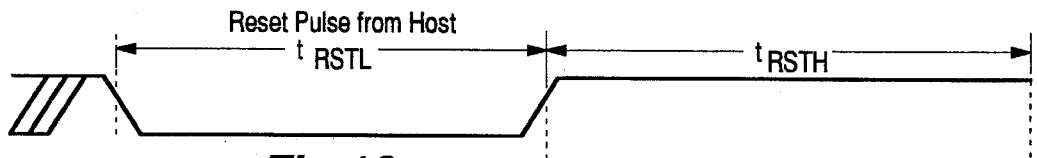
FIG. 16 shows the timing of reset pulse operations, on the one-wire bus, in the presently preferred embodiment.
Figure 17:
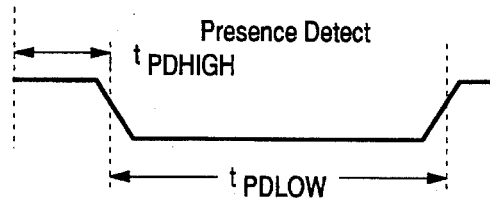
FIG. 17 shows the timing of the presence-detect operations (in relation to the reset), on the one-wire bus, in the presently preferred embodiment.

The presence detect layer is used to signal to a host device that a new device has been attached to the 1-wire port. The 1-wire port from the host remains at a logic high level during quiescent times between read and write time slots. This high time must be present for a minimum of 15 uS before the new device can assert a presence detect signal. The presence detect signal will be a logic low level asserted by the newly attached device which remains low for a maximum of 240 uS and is then released (see FIG. 16). This low logic level can be detected by the host and used as an interrupt condition for the host processor.

Device Reset

The Reset layer is used to reset the attached 1-wire devices. This allows the host to place the 1-wire device or devices into a known state at any time. The reset signal consists of a logic low level asserted by the host for a minimum of 480 uS. After this, the host must release the 1-wire signal line and allow it to rise to a logic high level. This high logic level must be maintained by the host for a minimum of 480 uS before any data can be exchanged. During this logic high time, any device present on the 1-wire signal line will assert its presence- detect waveform.

1-Wire Commands

There are four commands which can be issued by the host on the 1-wire port.

These are:

1) [33 hex] read ROM data
2) [55 hex] match ROM data
3) [F0 hex] search ROM data
4) [CC hex] pass-through mode Read ROM Data Upon recognition of the command word [33 hex], the DS1205 is ready to respond to the next eight read time slots with the Type Identifier number. This n-tuber is a hexadecimal 02 and is unique to the DS1205 part. After receipt by the host of the Type Identifier number, the DS1205 is ready to output the unique 48-bit serial number contained within the device. The host must issue 48 read time slots to retrieve this number. Following the 48-bit serial number is an eight-bit Cyclic Redundancy Check (CRC) value. This CRC value has been calculated over the Type Identifier and Serial Number, 56 bits total, using the following polynomial:

$$p(x)=x^2+x^3, \text{ assuming } x0 \Rightarrow LSB$$

This calculated value is then lasered into the part at the time of manufacture. To read the CRC value, the host must issue eight additional read time slots.

Match ROM Data

The Match ROM data command is used as a device select when multiple 1-wire devices are connected to a single bus. This command allows the host to address any one of the multiple 1-wire devices on an individual basis. To do a Match ROM data command, the host must issue the command [55 hex] to the device with eight write time slots. Following the command byte, the host must write the desired device's Type Identifier, serial n-tuber, and CRC byte. If all of these values match the data stored internally in the ROM, the DS1205 can now be accessed using the standard DS1205 commands and protocol. If any of the bit values transmitted by the host fail to match the ROM data pattern, the access will be terminated. To return from a pattern fail condition, the host must issue a Reset command:

| Type ID | 48-bit Serial Number | CRC | transmit ————————>

Search ROM Data

The Search ROM data command allows the host 1-wire device to poll efficiently to determine the unique ROM address of all devices on the 1-wire bus. In this mode, each of the bits of the ROM data requires three time slots on the 1-wire bus. The first two time slots are read time slots in which the DS1205 transmits back to the host the value of the ROM bit followed by its complement. The third time slot is a write time slot in which the host supplies its desired value for the ROM bit. The DS1205 then compares the desired value with the actual ROM bit. If they disagree, the DS1205 will go to a high impedance state until a RESET is issued by the host. If the bits agree, the DS1205 increments its internal counter to point to the next bit in the ROM data and then repeats the same set of three time slots for the next bit. If all bits of the ROM are matched correctly, the host may access the DS1205 with the standard command structure for the part.

Example of a ROM Search

The following example of the ROM search process assumes two different DS1205s are connected to the same 1-wire bus. The ROM data of the two DS1205s begins as shown:

| ROM0- | 00110101 . . . |
|-------|----------------|
| ROM1- | 00010001 . . . |

The search process is as follows:

1) The host begins by resetting all devices present on the 1-wire bus.
2) The host will then issue the Search ROM Data command on the 1-wire bus.
3) The host executes two read time slots and receives a zero bit followed by a one bit. This indicates that all devices still coupled have zero as their first ROM bit.
4) The host executes a write zero time slot as the third slot in the set of three. This action keeps ROM2 and ROM1 coupled.
5) The host executes two read time slots and receives a zero bit followed by a one bit. This indicates that all devices still coupled (ROM2 and ROM1) have a zero as their second ROM bit.
6) The host will executes a write zero time slot as the third time slot to keep ROM2 and ROM1 coupled.
7) The host executes two read time slots and receives two zero bits. This indicates that both one bits and zero bits exist as the third bit of the ROM I.D.'s of the devices coupled.
8) The host executes a write zero time slot as the third bit. This decouples ROM2, leaving only ROM1 still coupled.
9) The host reads the remainder of the ROM bits for ROM1 using three time slots for each bit. After this, the host can communicate to the underlying logic, if desired. This completes the first ROM I.D. search pass, in which one of the devices was found.
10) The host starts a new ROM search sequence by repeating steps 1 through 7 above.
11) The host supplies a write one time slot as the third bit. This decouples ROM1, leaving only ROM2 still connected.
12) The host reads the remainder of the ROM I.D. bits for ROM2 and communicates with the underlying logic, if desired.

If more devices are present on the 1-wire, the same structure as presented above will be used to determine the uniqure ROM I.D. of each attached device. As soon as multiple devices are detected, a series of writes will be used to disable that branch in the search path.

Note the following.

The host learns the unique address CROM data pattern) of one 1-wire device on each ROM SEARCH operation. The time required to derive the part's unique address is:

960 uS+[8+3 X 64]X 61 uS=13.16 mS

The host is therefore capable of identifying 75 different 1-wire devices per second.

Additionally, the data obtained from the two read time slots of each set of three time slots have the following interpretations:

00 - There are still devices attached which have conflicting bits in this position.

01 - All devices still coupled have a zero bit in this bit position.

10 - All devices still coupled have a one bit in this bit position.

11 - There are no devices attached to the 1-wire bus. (This is an error condition).

Pass-thru Mode

The Pass-Thru command is used to allow a host connected to the 1-wire bus to gain access to the DS1205 directly. It can be used only when there is one DS1205 on the 1-wire bus. This command bypasses the serial number internal to the DS1205 and allows the host to directly control the DS1205 with the DS1205 commands and protocol.

3-Wire Bus

The 3-wire bus is comprised of three signals. These are the RST\ (reset) signal, the CLK (clock) signal, and the DQ (dam) signal All data transfers are initiated by driving the RST\ input high. The RST\ signal provides a method of terminating a data transfer.

Figure 18:
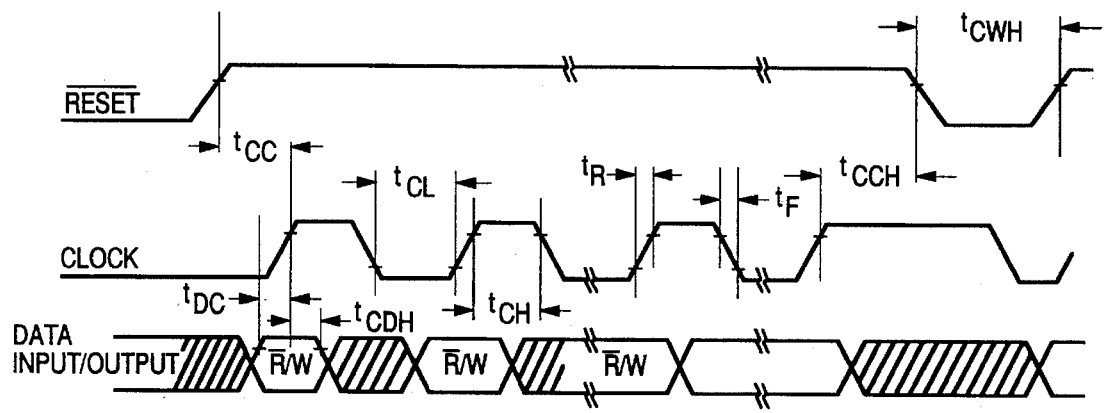
FIGS. 18 and 19 show the timing of data transfers on the three-wire bus, in the presently preferred embodiment.
Figure 19:
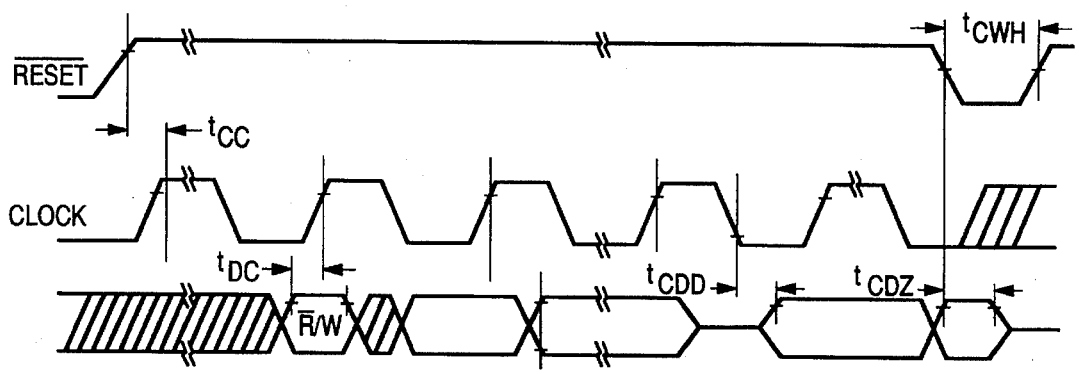

A clock cycle is a sequence of a falling edge followed by a using edge. For data inputs, the data must be valid during the rising edge of a clock cycle. Command bits and data bits are input on the rising edge of the clock and data bits are output on the falling edge of the clock. All data transfers terminate if the RST\ is low and the DQ pin goes to a high impedance state. When data transfers to the DS1205 are terminated by the RST\ signal going low, the transition of the RST\ going low must occur during a high level of the CLK signal. Failure to ensure that the CLK signal is high will result in the corruption of the last bit transferred. Data transfers are illustrated in FIGS. 18 and 19 for normal modes of operation.

1-Wire/3-Wire Arbitration

The DS1205 can utilize both the 1-wire and the 3-wire busses simultaneously. Neither input bus has priority over the other. Instead, if both inputs are being used, the signal arriving first will take precedence. More simply, if the 1-wire interface becomes active before the 3-wire interface, all communications will take place on the 1-wire bus. The 3-wire bus will be ignored in this case. The same condition occurs for the 1-wire interface if the 3-wire interface becomes active first.

Thus, some significant features of the presently preferred embodiment—not all of which are claimed to be separately novel—include the following:. Four addressable read/write data partitions; Three secure read/write data partitions of 384 bits each; One non-secure read/write data partition of 512 bits; Secure data cannot be deciphered by reverse engineering; Supports a hierarchical privilege system; Partitioned memory thwarts pirating; 64-bit password and I.D. fields provide a barrier against accidental key erasure; Maximum data transfer rate of 2 million bits/second; Low-power CMOS circuitry; 3-wire bus-compatible; 1-wire "touch" bus-compatible; Applications include software authorization, proprietary data, financial transactions, secure personnel areas, and systems access control.

Preferred Package

Figure 21:
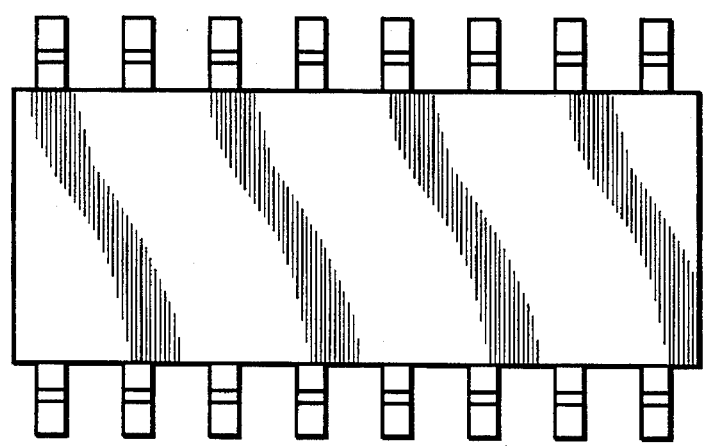
FIG. 21 shows the preferred package of the chip of the presently preferred embodiment.
Figure 22A:
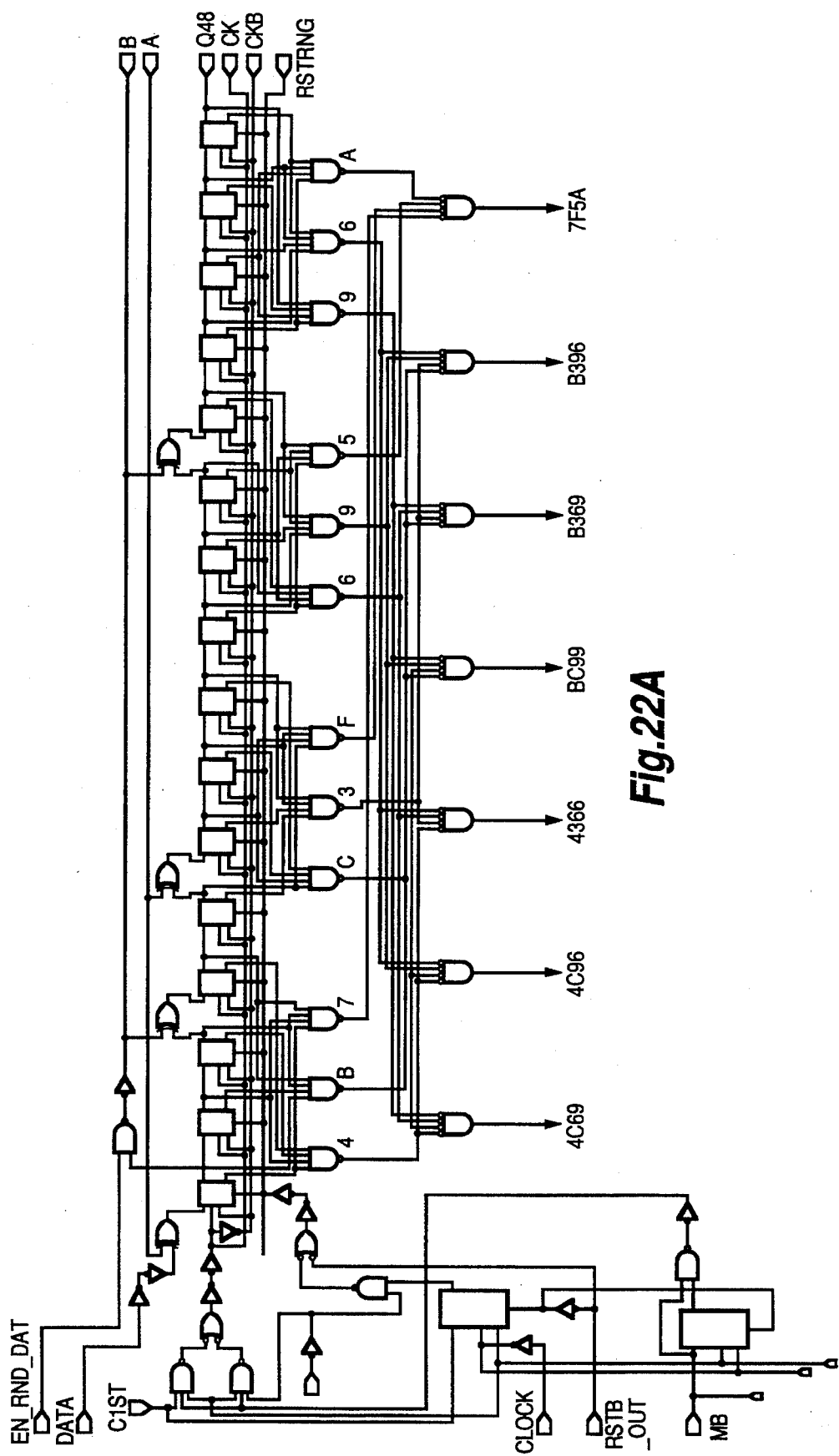
FIGS. 22A–22D show circuitry which is essentially the same as that used, in the presently preferred embodiment, for decoding command words and also for pseudo-random number generation.
Figure 22B:
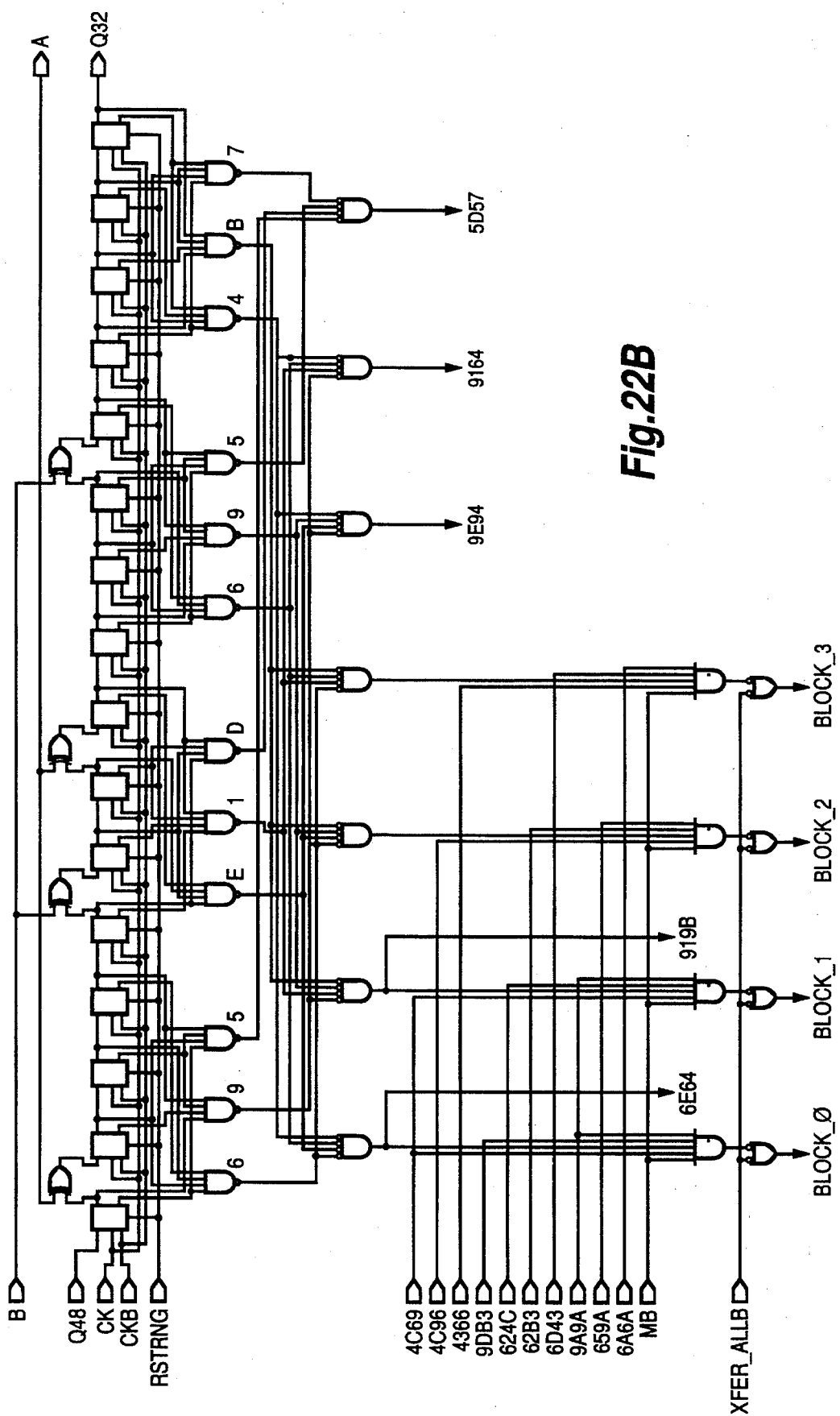
Figure 22C:
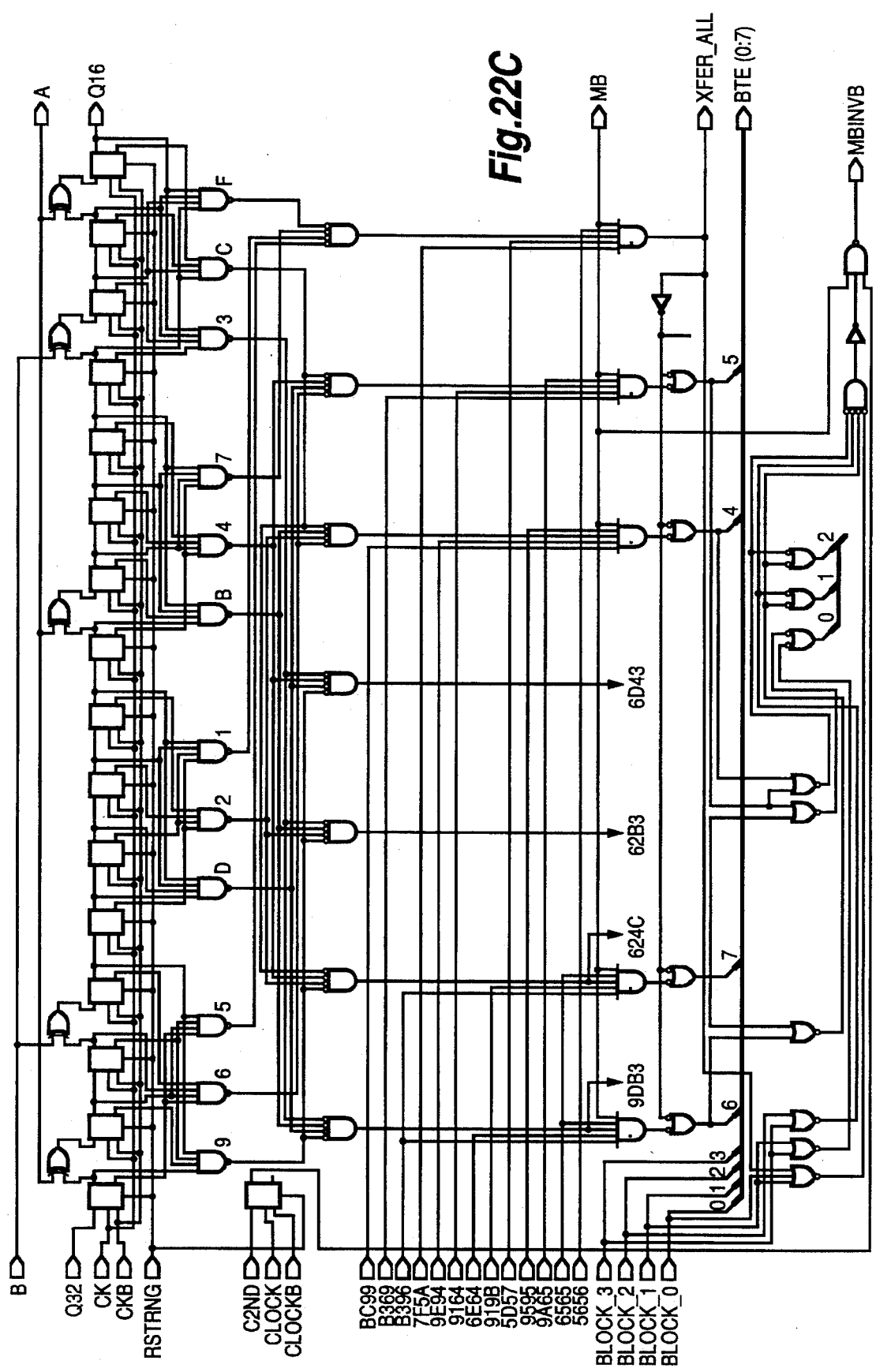
Figure 22D:
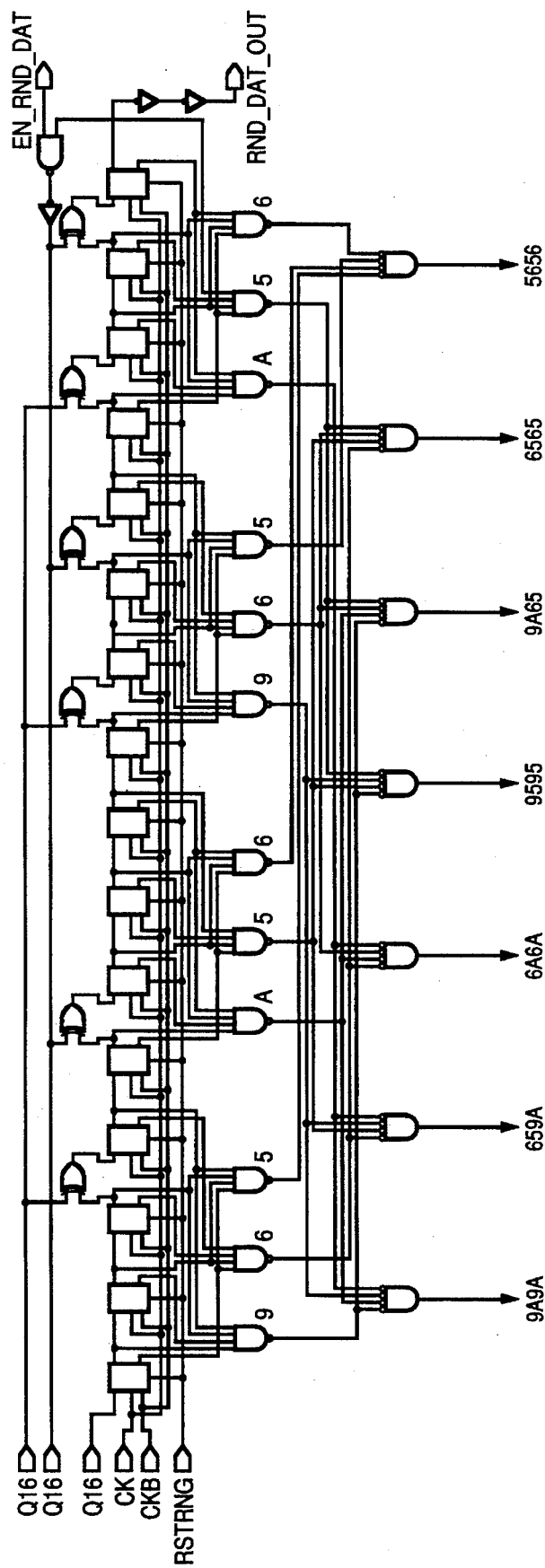

The preferred packaging embodiment is an 8-pin SOIC package, as shown in FIG. 21. However, of course, a wide variety of other package types can be used instead if desired.

Chip Layout

Figure 20:
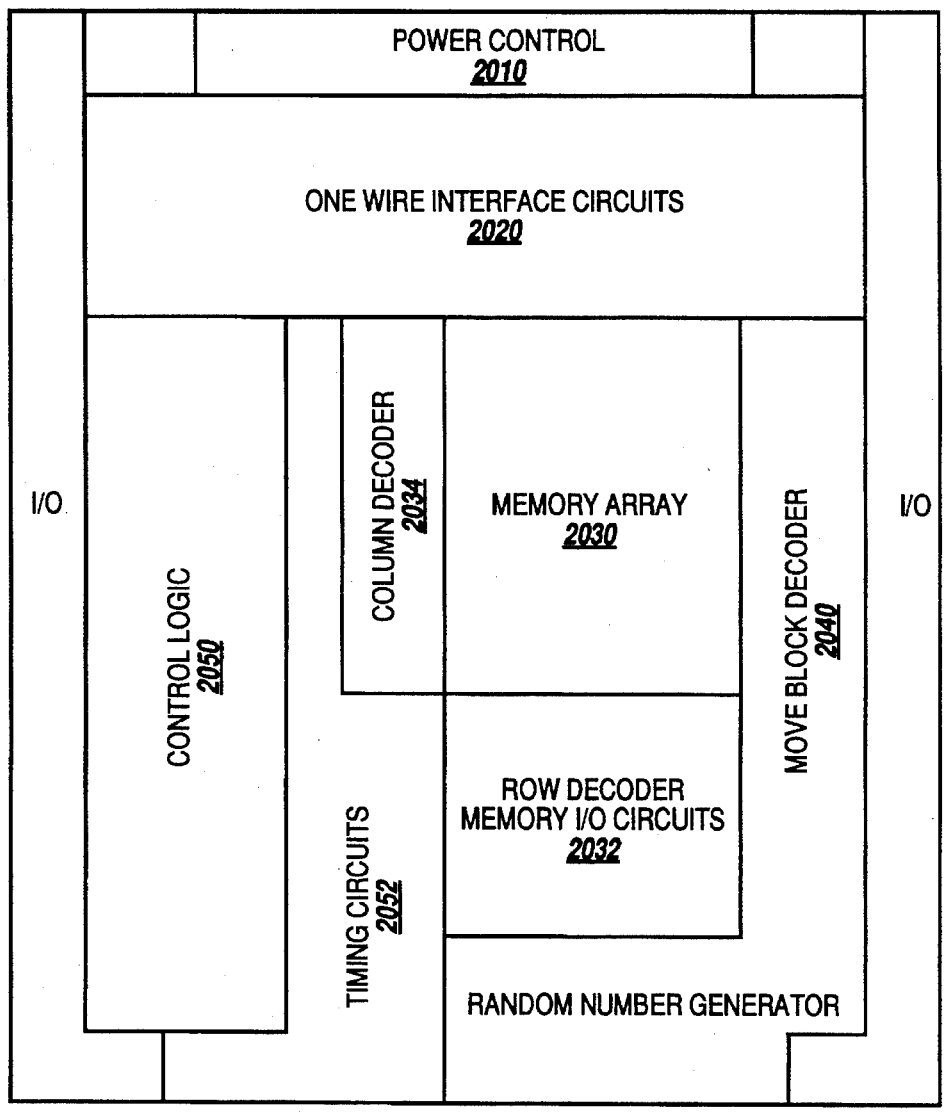
FIG. 20 shows the overall layout of the chip of the presently preferred embodiment.

FIG. 20 shows the overall layout of the chip of the presently preferred embodiment.

At the center of the chip is a low-power memory array 2030. In the presently preferred embodiment, this is an array of 32 rows by 64 columns of conventional 6-transistor full-CMOS SRAM cells.

The column decoder logic 2034 is conventional (for a serially accessed RAM). However, the row decoder logic 2032 includes memory I/O circuits, and specifically a lookup RAM, which provides remapping of memory blocks as described more fully below.

Power control circuitry 2010 is shown more fully in FIG. 24, and is discussed below.

Figure 25B:
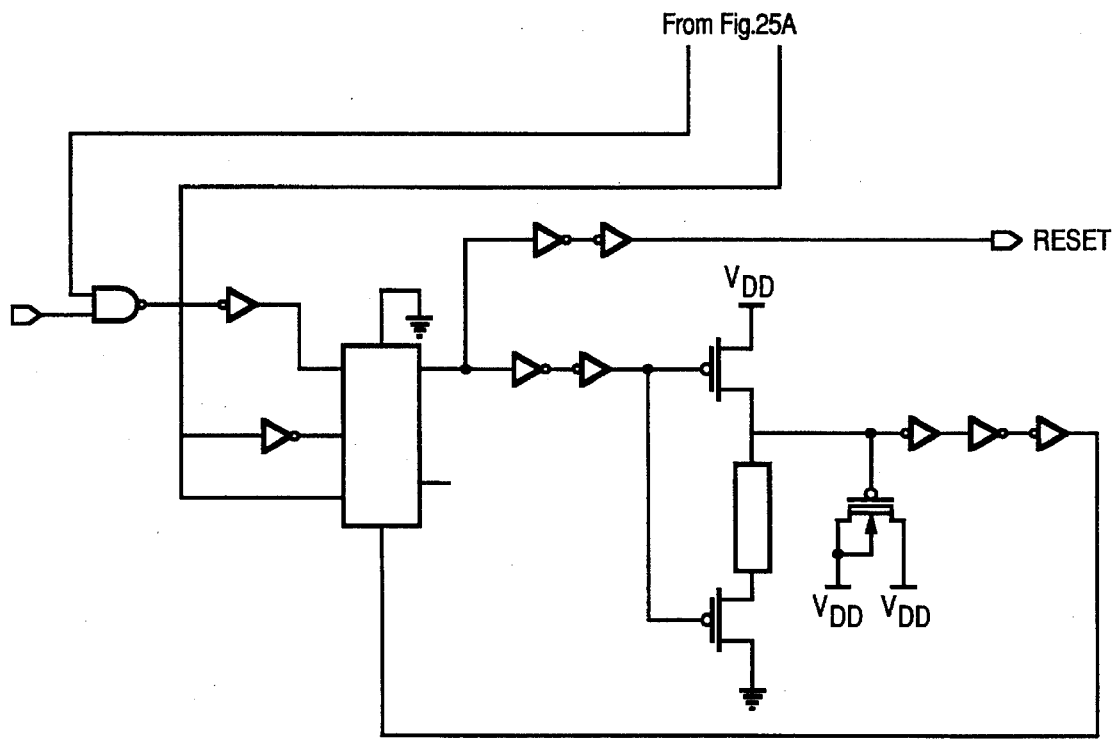

One-wire interface circuitry 2020 provides translation from the one-wire interface protocol to a standard 3-wire interface, and is shown more fully in FIGS. 25A and 25B.

The move-block decoder and random number generator circuitry 2040 are shown more fully in FIGS. 25A and 25B, and are discussed in detail below.

The control logic 2050 contains a shift register, and decode logic, for decoding a functional command word (such as "Get Secure Data" or "Set Secure Data"). Thus, control logic 2050 and timing circuits 2052 are essentially the same as are commonly used in any chip accessed by a serial port.

If the functional command word is "Move Block," then a further specifier must be transmitted to specify which block is to be moved. This further specifier is decoded by a different shift register, in the move block decoder 2040, described below in detail. This same shift register in the move block decoder 2040 is also used for repeatable pseudorandom number generation, as will be described below.

Specific Circuitry

Some significant features of circuitry in the chip of the presently preferred embodiment will now be described in further detail.

Pseudo-Random Number Generation

FIGS. 22A through 22D show the circuitry which provides pseudo-random number generation.

A chain of D-flops 2210 provides a basic shift register structure. However, note that the connection is occasionally broken by an XOR gate 2220, which combines the propagating logic state with an input from the feedforward line B or the feedback line A. These flip-flops have slightly larger output drivers than normal, in order to drive the decoding logic.

Line B is a feedforward line, which carries forward a state from an early stage for combination into various other nodes along the chain. Line A is a feedback line, which carries back a state from a later stage for combination into various other nodes along the chain.

However, note that the feedforward and feedbacklines are only enabled when signal EN_RND_DATA ("enable random data") is active.

When the EN_RND_DATA signal is not active, the combination of gates 2230 provides a simple combinatorial decoder. This combinatorial logic provides decoding of the block specifier which is used in a block move operation. The 9 possible block destinations are indicated by BLOCK_0, BLOCK_1, etc., and XFER_ALL (which indicates that the entire scratchpad is to be copied to the target subkey).

Thus, the structure shown has a double purpose: when a comparator (not shown) detects a password mismatch, the line EN_RND_DATA is activated to send out garbage. If line EN_RND_DATA is not activated, this shift register structure can operate as a decoder to determine block address.

Note that, if the decoding structure shown detects a mismatch between the specified value and the target subkey's password, signal MBINVB goes active.

When scrambled data is clocked out of the structure shown, it appears on line RND_DAT_OUT. A multiplexer (not shown) selects this data stream for output if needed.

The structure shown differs from the actual manufactured embodiment of the DS1205 chip in two respects. First, in the structure shown the XOR gates 2220 have been reconfigured. The structure shown will work perfectly well, and disclosure of the actual manufactured structure would jeopardize the security of that structure. Secondly, in the structure shown, an input signal SCRMBL enables operation of the random number generator whenever a Get Secure Data operation is requested. Thus, if scrambling is required, the shift registers already contain scrambled data when data output is requested By contrast, in the actual manufactured embodiment, the EN_RND_DATA signal is not enabled until after all 64 bits have been read in, and the preceding comparator indicates whether a mismatch is present. Either version will work perfectly well, but the version pictured is believed to be slightly preferable.

Block Assignment Pointer Management

Figure 23A:
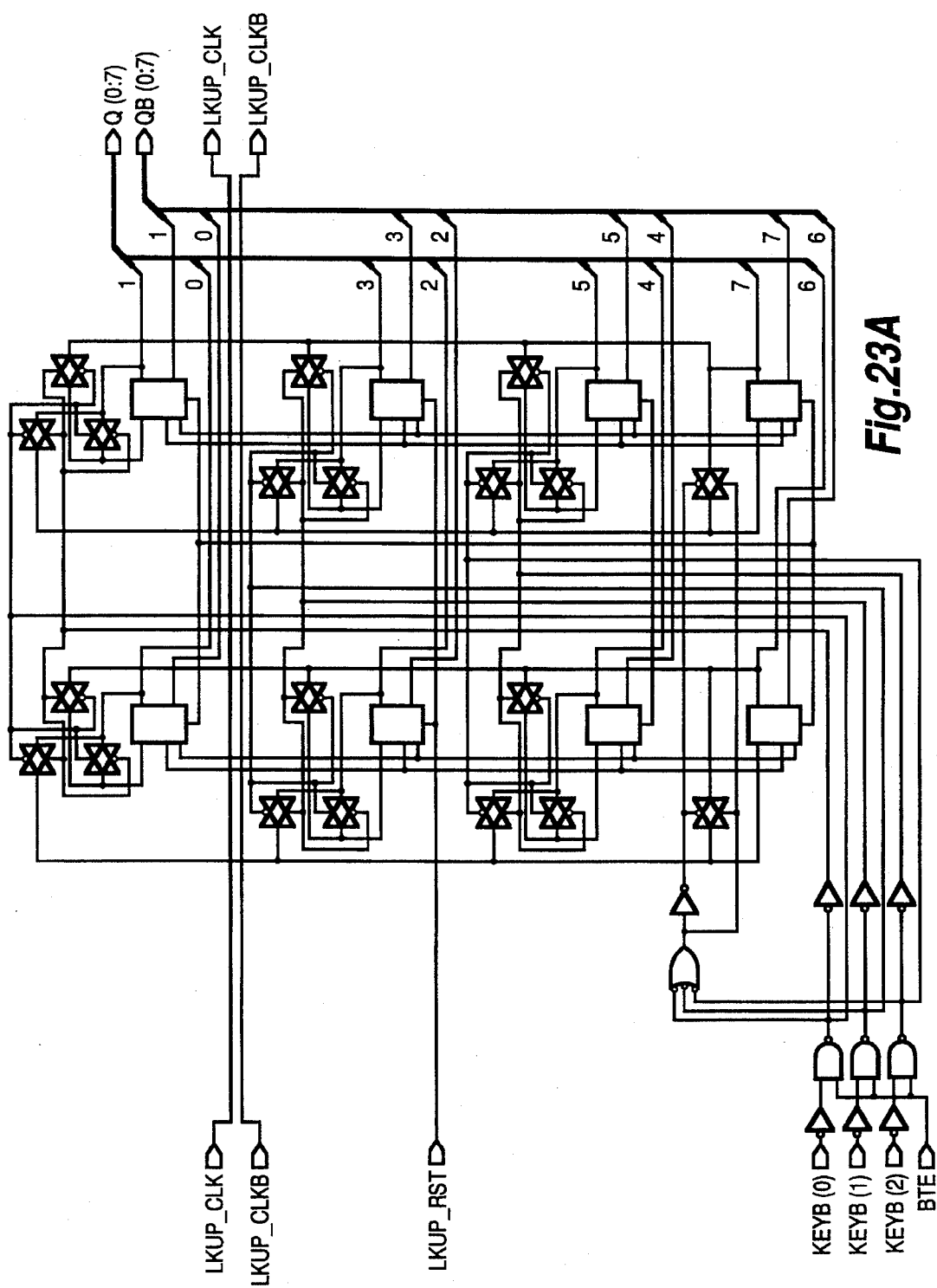
FIGS. 23A–23C show the circuitry used, in the presently preferred embodiment, for holding block pointer assignments and for checking that the block pointers are mutually consistent.
Figure 23B:
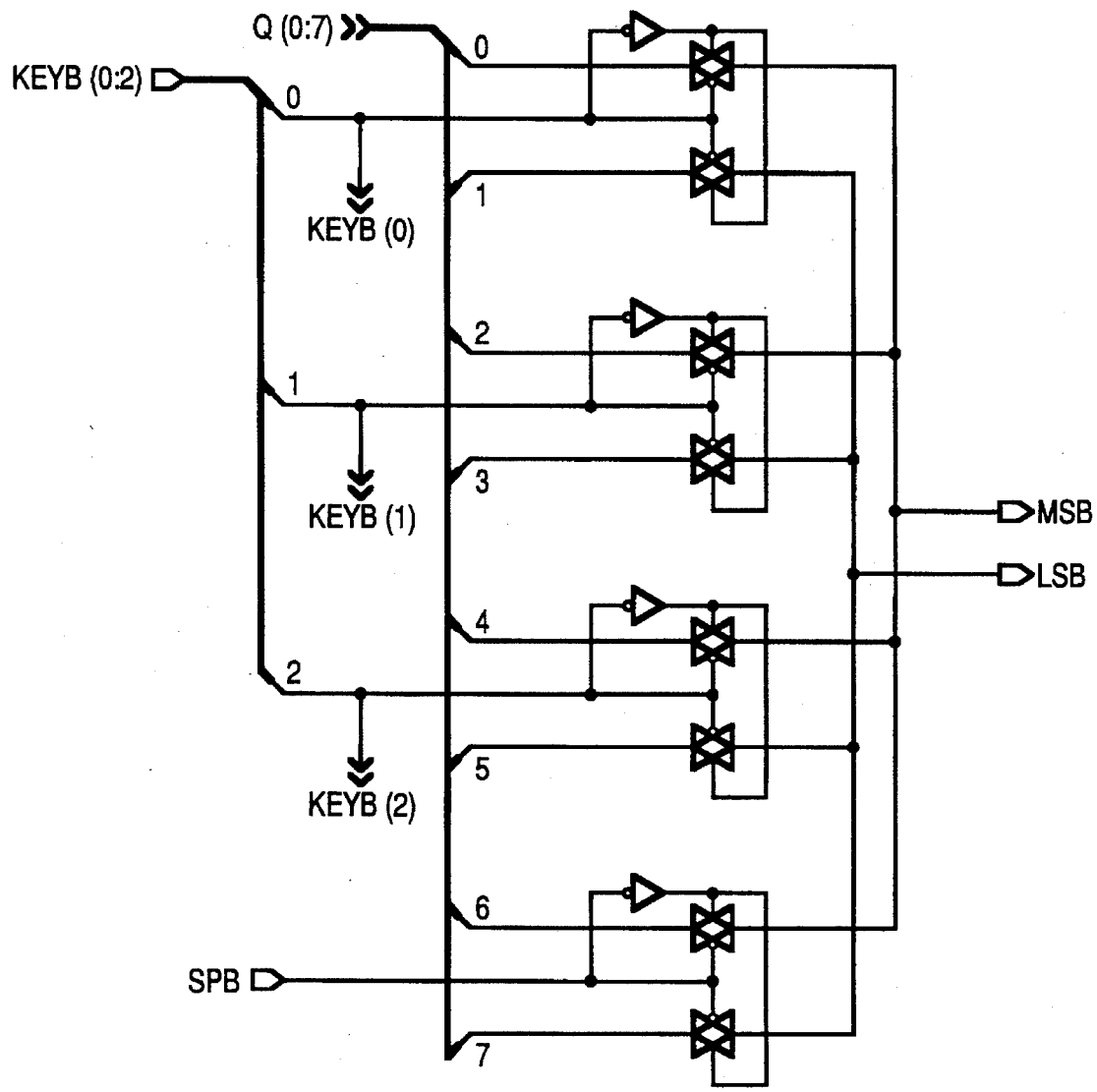
Figure 23C:
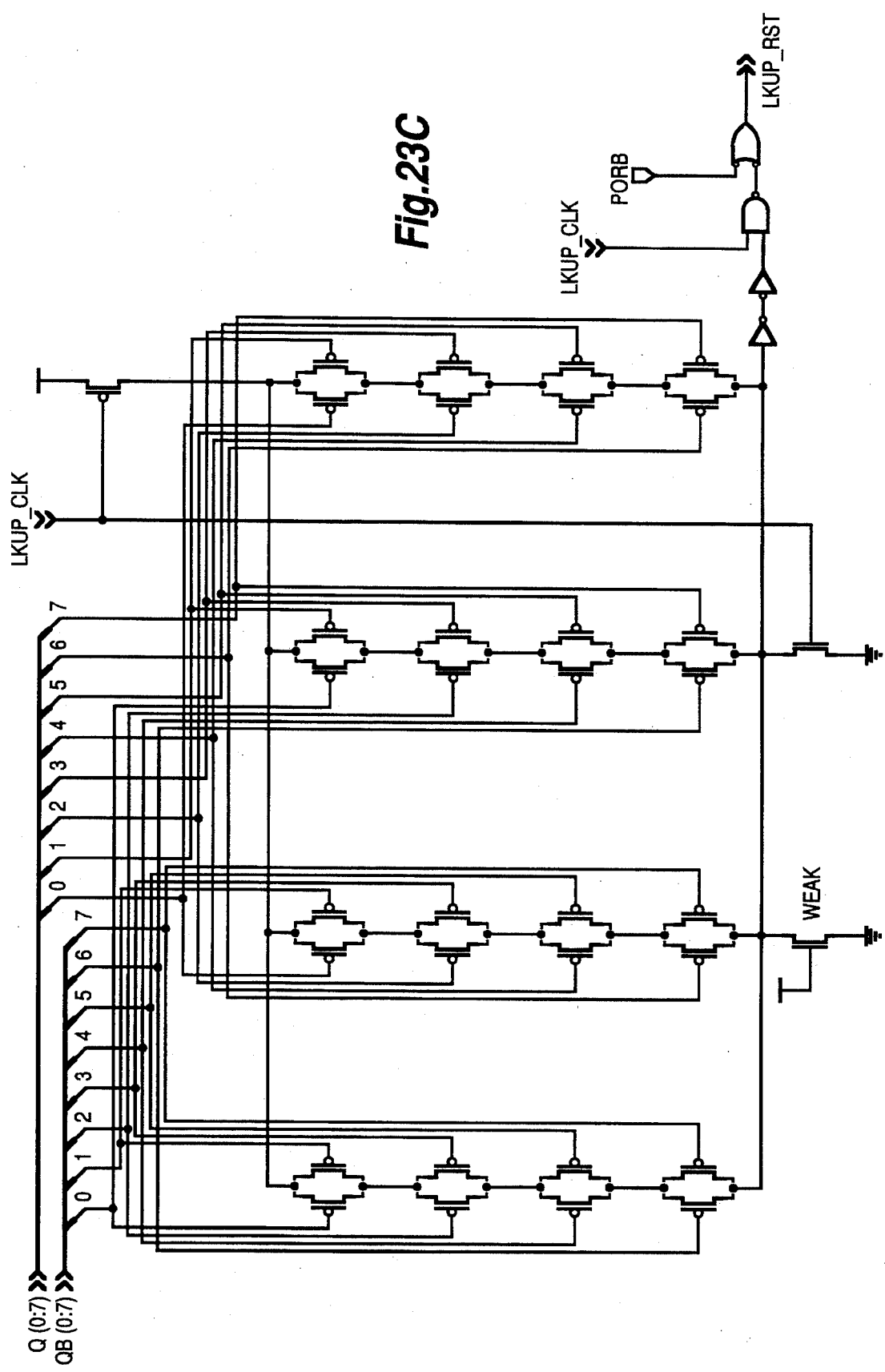

FIGS. 23A through 23C show details of the translation register and associated logic.

FIG. 23A generally shows a key portion of the translation register. The logic shown is replicated 8 times (once for each segment of the key). For example, the register set for block 3 contains the row address for subkeys 0, 1, and 2, and the scratch pad.

When a move block command is specified, these registers will simply swap addresses between the scratchpad registers and the registers associated with the selected key.

FIG. 23B shows output multiplexing logic associated with the circuitry of FIG. 23A. This circuitry multiplexes the address for the selected subkey onto predecoded row lines MSB and LSB.

FIG. 23C is the illegal state detect circuit. This is an array of pairs of PMOS devices, wired to detect any redundant state in the registers of FIG. 23A. If any such state is detected, signal LKUP_RST is driven active (high), to force the registers of FIG. 23A to a predetermined default state.

Memory Array

The memory array itself, in the presently preferred embodiment, is an entirely conventional structure of 6-transistor full-CMOS SRAM cells.

Power Source Selection

Figure 24:
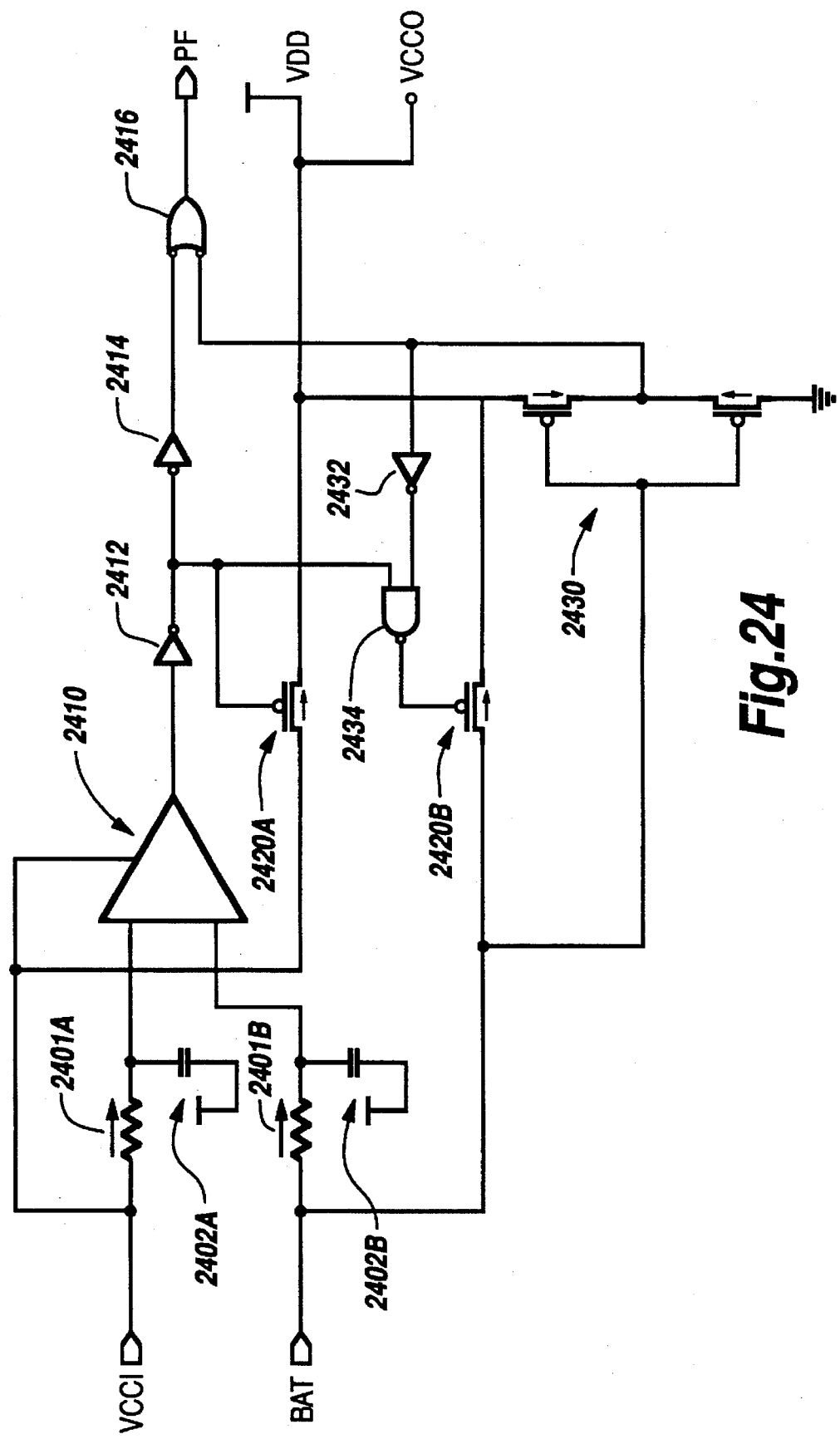
FIG. 24 shows the circuitry used for selection of the power supply input, in the presently preferred embodiment.

FIG. 24 shows the circuitry used, in the presently preferred embodiment, for power source selection.

Input VCCI is filtered by resistor 2401A and capacitor 2402. Input BAT is filtered by resistor 2401B and capacitor 2402B. Comparator 2410 compares the filtered versions of the two inputs BAT and VCCI. When powered up, this comparator will provide a high output if VCCI exceeds BAT.

If the comparator 2410 provides a high output, inverter 2412 will drive a low level onto the gate of large PMOS switching transistor 2420A, which connects VCCI directly to VDD.

However, note that this comparator is powered from input VCCI, not from the on-chip power supply VDD. Thus, if VCCI is below the minimum threshold voltage for a "high" logic level the output of the comparator will necessarily be low (even if the BAT input is even lower than VCCI), and thus VCCI will not be connected to VDD under these circumstances.

If the BAT input is higher than VCCI (and is also at least a logic "high" level), then the output of comparator 2410 will be low, and the output of inverter 2412 will be high. This will turn on the large PMOS switching transistor 2420B, IF the other input to NAND gate 2434 is also high.

However, note that BAT is also connected directly to the input of inverter 2430. If BAT is not high enough to drive the output of 2430 low, then the output of inverter 2432 will be low, and the output of NAND gate 2434 will necessarily be high. Thus, if BAT is low, the large PMOS switch transistor 2420B will always be turned off, and BAT will never be connected directly to VDD.

Thus, if both BAT and VCCI are low, neither of these pins will be connected to the on-chip power line VDD. Of course, if no pins of the chip were powered, the chip would reach a uniform potential, and would be inactive. However, if the third pin (VCCO, in the presently preferred embodiment) is connected to a battery, the chip can still be powered up. (In this case the chip will operate permanently in the battery operated mode.)

One-Wire Interface

FIGS. 25A and 25B are two parts of a single Figure which shows the one-wire-to-three-wire conversion circuit used, in the presently preferred embodiment, in the integrated circuit of FIG. 20. This circuitry is a fairly straightforward implementation of the logical relationships described, and is pictured here merely for completeness.

Interacing Keys to a Printer Port

Figure 26:
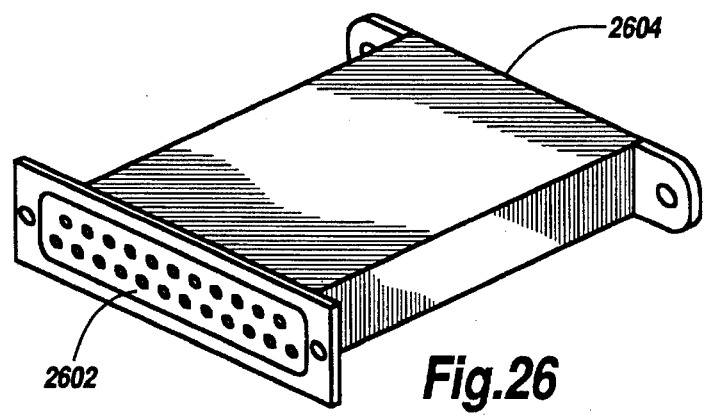
FIG. 26 shows the external appearance of the printer port adapter + keymodule of the presently preferred embodiment.

FIG. 26 shows the external appearance of the printer port adapter+keymodule of the presently preferred embodiment. Note that this adapter includes a male DB25 conector 2604 on one side, and a female DB25 connector 2602 on the other. Thus, this adapter can be left plugged into the printer port of an end-user's computer, and the printer can be plugged into this adapter.

In the particular embodiment shown, the key is permanently sealed inside the adapter. Thus, this embodiment is somewhat inflexible; it is contemplated that it will be more preferable to provide an adapter which includes slots for user insertion of various keys.

Figure 27:
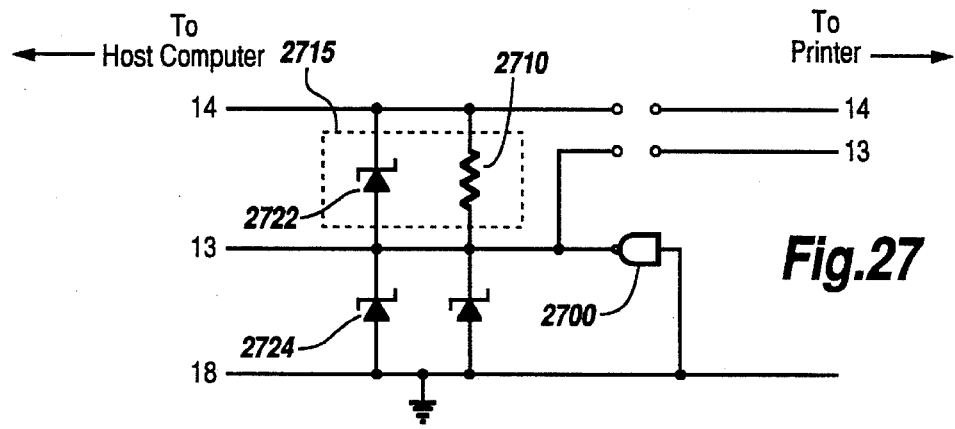
FIG. 27 shows the circuit components actually used in the presently preferred embodiment of the adapter/key module of FIG. 26.

FIG. 27 shows the circuit components actually used in the presently preferred embodiment of the adapter/key module of FIG. 26. An electronic key 2700 is connected between line 13 and ground (line 18). (All line numbers reference the standard line number assignments in the industry-standard PC-compatible printer port.) A 1 kilohm load resistor is connected between line 13 and line 14, and a zener diode (rated at 5.6 V, in the presently preferred embodiment) clamps the voltage of line 13. In addition, a first Schottky diode is connected between lines 14 and 13, a first Schottky diode is connected between lines 14 and 13, and another Schottky diode is connected between lines 13 and 18. Thus, when the voltage of line 14 goes down, the Schottky diode 2722 bypasses the resistor 2710 which when combined comprise control circuitry 2915, permitting the voltage to fall rapidly.

Thus, in this arrangement, pins 13, 14, and 18 are passed through the adapter, and the extra components shown do not prevent these lines from functioning according to their normal signal assignments. However, the host computer can also Coy driving line 14 in accordance with the one-wire protocol described above) communicate with an electronic key when desired.

Note that the circuit arrangement shown has the effect of splitting the one-wire bus definition described above. However, correct operation according to the above protocol is still achieved.

Figure 28:
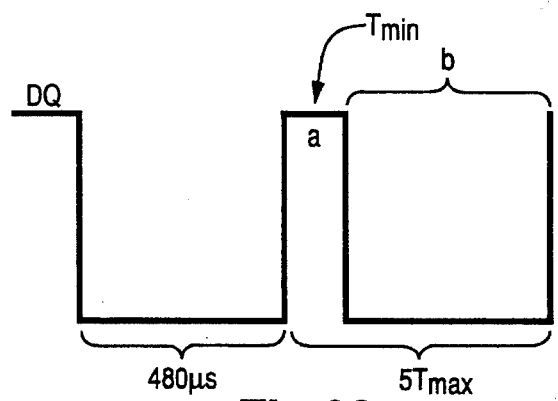
FIG. 28 shows the timing relations preferably used to permit the host computer to communicate with one or more electronic keys, whose timing characteristics may vary over a wide range of uncertainty.
Figure 29:
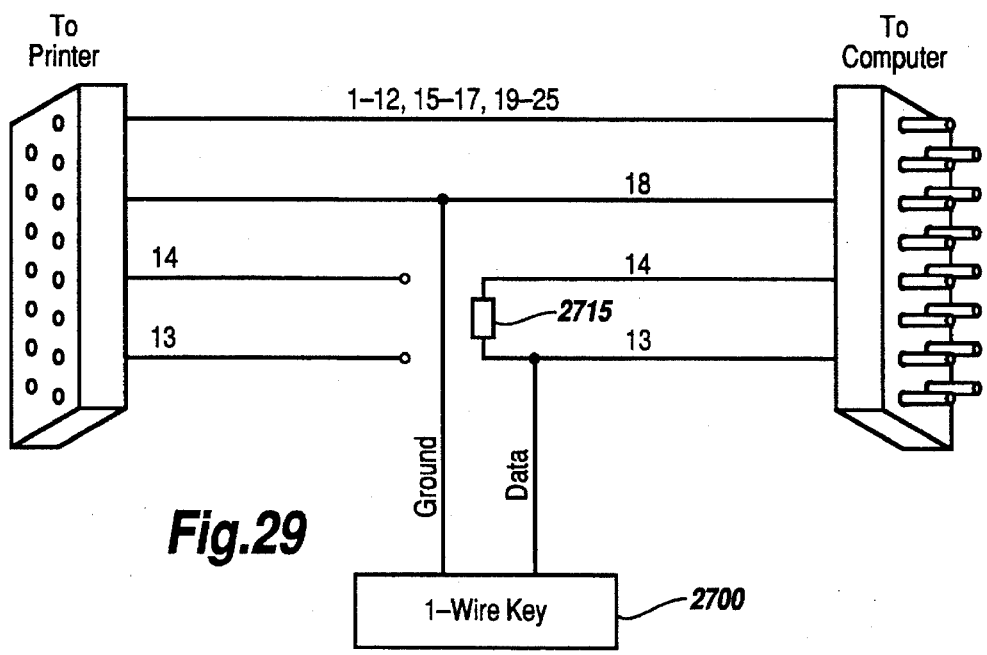
FIG. 29 shows the interconnections described in FIG. 27 as combined with the plug shown in FIG. 26.

FIG. 28 shows the timing relations preferably used to permit the host computer to communicate with one or more electronic keys, whose timing characteristics may vary over a wide range of uncertainty. The host computer pulls the signal line low for 480 milliseconds, to poll for the presence of electronic keys. The host brings the line back high before the earliest time in which a key could respond. When a key responds, the host continues to monitor the line: the latest time at which any key is still pulling the line low tells the host what is the speed of the slowest key on the line. With this information, the host can condition the timing of further accesses appropriately: send operations are timed to permit interface with the slowest key present; receive operations are timed to interface with the fastest key present. FIG. 29 shows the interconnections described in FIG. 27 combined with the plug shown in FIG. 26.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

As will be recognized by those skilled in the art, the innovative concepts described in the present application can be modified and varied over a tremendous range of applications, and accordingly their scope is not limited except by the allowed claims.

What is claimed is:

1. An electronic system, comprising:

(a) a plurality of complementary multipin connectors, each complementary multipin connector of said plurality of complementary multipin connectors having at least one pin and at least one internal electrical connection each complementary multipin connector of said plurality of complementary multipin connectors interconnected via said at least one internal electrical connection of each complementary multipin connector of said plurality of complementary multipin connectors, a first complementary multipin connector of said plurality of complementary multipin connectors electrically coupled to a first electrical device via said at least one pin of said fist complementary multipin connector and a second complementary multipin connector of said plurality of complementary multipin connectors electrically coupled to a second electrical device via said at least one pin of said second complementary multipin connector;

(b) an electronic key having a firs terminal selectively electrically coupled to said at least one internal electrical connection of said first complementary multipin connector of said plurality of complementary multipin connectors and a second terminal selectively electrically coupled to said at least one internal electrical connection of said second complimentary multipin connector of said plurality of complementary multipin connectors, said first terminal electrically coupled to at least one internal electrical connection that is internally electrically coupled to provide a one-wire signal interface to said electronic key, said first terminal internally electrically coupled to said second terminal within said electronic key, said electronic key selectively regulates flow of information between said first and second terminals; and (c) said first terminal has a voltage level, said one-wire signal interface is implemented by holding said first terminal to a first voltage level for a first time period, creating a transition between said first voltage level and a second voltage level, holding said first terminal to said second voltage level for a second time period, and selectively sampling said voltage level of said first terminal to determine whether said data value is a first data value or a second data value at a first time, said data value transferred via said one-wire signal interface comprises at least one self-synchronized bit, each self-synchronized bit of said at least one self-synchronized bit is independent of every other self-synchronized bit of said at least one self-synchronized bit.

2. The device of claim 1, wherein each complementary multipin connector of said plurality of complementary multipin connectors are physically and electrically compatible with a standard connector and port definitions.

3. The device of claim 1, further comprising a resistor and a diode electrically coupled in parallel between said first terminal of said electronic key and one internal connection of said at least one internal electrical connection of said first complementary multipin connectors of said plurality of complementary multipin connectors.

4. The device of claim 2, wherein said standard connector and port definitions are a personal computer printer ports.

5. The device of claim 1, wherein said plurality of complementary multipin connectors are housed in a common housing.

6. The device of claim 1, wherein said second complementary multipin connector is a male connector and said first complementary multipin connector is a female connector that are mutually complementary.

7. The device of claim 1, wherein said first electrical device is a printer and said second electrical device is a personal computer.

8. The device of claim 1, wherein said first electrical device and said second electrical device conduct operations independently and in conjunction with each other and said electronic key does not disturb said operations.

9. The device of claims 7, wherein said printer and said personal computer conduct a plurality of operations independently and in conjunction with each other and said electronic key does not interfere with said plurality of operations.

10. The device of claim 1, wherein a second electronic key having a first terminal and a second terminal, said first terminal of said second electronic key electrically coupled to said at least one internal electrical connection of said first complementary multipin connector of said plurality of complementary multipin connectors and said second complementary multipin connector of said plurality of complementary multipin connectors and said second terminal of said second electronic key electrically coupled to said at least one internal electrical connection of said first complementary multipin connector of said plurality of complementary multipin connector, said first terminal and said second terminal of said second electronic key internally electrically coupled together within said second electronic key to provide said one-wire signal interface to said at least one internal electrical connection of said first complementary multipin connector and to said second complementary multipin connector of said plurality of complementary multipin connectors.

11. The device of claim 10, wherein said one-wire signal interface also exists between said electronic key and said second electronic key.

12. The device of claim 1, further comprising a timing control system electrically coupled to each complementary multipin connector of said plurality of complementary multipin connectors to control timing operations selected from the group consisting of determining how long to hold said first terminal to said first voltage level for said first time period, determining when to create said transition between said first voltage level and said second voltage level, determining how long to hold said first terminal to said second voltage level for said second time period, and determining when to sample said voltage level of said first terminal to determine whether said data value is said first data value or said second data value at said first time period, so that said one-wire signal interface transfers said at least one self-synchronized bit, each self-synchronized bit of said at least one self-synchronized bit is independent of each other.

13. The device of claim 12, wherein said timing control system comprises a microprocessor to control and manage said timing operations.

14. The device of claim 13, wherein said first electrical device is a personal computer and said second electrical device is a printer, said microprocessor is inside said personal computer and used by said personal computer to coordinate other activities.

15. The device of claim 1, said first terminal internally electrically coupled to said second terminal within said electronic key to provide a three-wire signal interface.

16. The device of claim 1, wherein said complementary multipin connectors of said plurality of complementary multipin connectors is electrically coupled to said first electrical device via a coaxial cable, said coaxial cable when combined with said at least one pin and said at least one internal electrical connection of each complementary multipin connector of said plurality of complementary multipin connectors electrically couple said first electrical device and to said second electrical device.

17. The device of claim 1, wherein said first electrical device is a coaxial cable and said second electrical device is a host computer.

18. The device of claim 17, wherein said coaxial cable connects to said second electrical device.

19. The device of claim 1, wherein a test password from said second electrical device is sent to said electronic key via said first terminal and said one-wire signal interface and said electronic key compares said test password to a password stored in an internal memory in said electronic key to determine if said test password and said password match up, and, if said test password and said password match up, then said electronic key transmits secret data from said internal memory in said electronic key.

20. The device of claim 19, further wherein if said test password and said password do not match up, then said electronic key transmits random information generated by a random number generator.

21. The device of claim 1, wherein said host device initiates a search to poll said electronic key that entails resetting said electronic-key and issuing a search data command on said one-wire bus.

22. The device of claim 19, wherein said password comprises 8 bytes of information.

23. The device of claim 7, wherein said personal computer has at least one input and at least one output and said electronic key regulates a flow of information between said at least one input and said at least one output of said personal computer and said first and second terminals of said electronic key.

24. An authorization system, comprising:
a first connector having at least one pin and at least one internal connection;
a second connector having at least one pin and at least one internal connection, said first connector and said second connector electrically coupled together via said at least one internal connection of said first connector and said at least one internal connection of said second cormcorox;
an electronic key having a first terminal and a second terminal, said first terminal of said electronic key selectively electrically coupled to said at least one internal connection of said first connector and said second terminal of said electronic key selectively electrically coupled to at least one internal connection of said second connector; and
control circuitry electrically coupled between said first terminal of said electronic key and said second terminal of said electronic key via a one-wire signal interface established between said first terminal of said electron key and said second terminal of said electronic key, said first terminal of said electronic key has a voltage level, said one-wire signal interface is implemented by holding said first terminal of said electronic key to a first voltage level for a first time period, creating a transition between said first voltage level and a second voltage level, holding said first terminal of said electronic key to said second voltage level for a second time period, and selectively sampling said voltage level of said first terminal of said electronic key to determine whether said data value is a first data value or a second data value at a first time, said data value transferred via said one-wire signal interface comprises at least one self-synchronized bit, each self-synchronized bit of said at least one self-synchronized bit is independent of every other self-synchronized bit of said at least one self-synchronized bit.

25. The authorization system of claim 24, wherein said first connector and said second connector are physically and electrically compatible with a standard connector and port definitions.

26. The authorization system of claim 24, wherein said control circuitry comprises a resistor and a diode electrically coupled in parallel between said first terminal of said electronic key and one internal connection of said at least one internal connection of a connector selected from the group consisting of said first connector or said second connector.

27. The authorization system of claim 25, wherein said standard connector and said port definitions are a personal computer printer ports.

28. The authorization system of claim 24, wherein said first connector and said second connector are housed in a common housing.

29. The authorization system of claim 24 wherein said first connector and said second connector are mutually complementary.

30. The authorization system of claim 24, wherein said first connector is electrically coupled to a first electrical device and said second connector is electrically coupled to a second electrical device.

31. The authorization system of claim 30, wherein said first electrical device is a printer and said second electrical device is a personal computer.

32. The authorization system of claim 30, wherein said first electrical device and said second electrical device transfer information therebetween and said electronic key does not disturb said transfer of information.

33. The authorization system of claim 31, wherein said printer and said personal computer transfer information therebetween and said electronic key does not interfere with said transfer of information.

34. The authorization system of claim 24, further comprising a second electronic key having said first terminal and a second terminal, said first terminal of said second electronic key selectively electrically coupled to said at least one internal connection of one of said first connector an a second terminal of said second electronic key selectively electrically coupled to said at least one internal connection of said second connector and second control circuitry electrically coupled between said first terminal of said second electronic key and said second terminal of said second electronic key to regulate a flow of information between said first terminal of said second electronic key and said second terminal of said second electronic key, said second electronic key selectively regulates flow of information between via a one-wire signal interface established between said first terminal of said second electronic key and second terminals of said second electronic key, said first terminal of said second electronic key has a third voltage level, said one-wire signal interface is implemented by holding said first terminal of said second electronic key to said first voltage level for said first time period, creating said transition between said first voltage level and said second voltage level, holding said first terminal to said second voltage level for said second time period, and selectively sampling said bird voltage level of said first terminal of said second electronic key to determine whether said data value is said first data value or said second data value at said first time, said data value transferred via said one-wire signal interface comprises said at least one self-synchronized bit, said each self-synchronize bit of said at least one self-synchronized bit is independent of every other self-synchronized bit of said at least one self-synchronized bit.

35. The authorization system of claim 24, wherein said one-wire signal interface exists between said electronic key and said second electronic key.

36. The authorization system of claim 24, wherein said one-wire signal interface communicates at least one communication signal, said at least one communication signal having timing requirements, said timing requirements controlled by a timing control system.

37. The authorization system of claim 36, wherein said timing control system comprises a microprocessor to control and manage said timing requirements.

38. The device of claim 37, wherein said first connector is electrically coupled to a personal computer and said second connector is connected to a printer, said microprocessor residing inside said personal computer and used by said personal computer to coordinate other activities.

39. The device of claim 24, wherein said first connector and said second connector connect to a coaxial cable, said coaxial cable when combined with said at least one pin and said at least one internal electrical connection of said first connector and said at least one pin and said at least one internal electrical connection of said second connector electrically couple said first electrical device and to said second electrical device.

40. The device of claim 38, wherein a test password is sent to said first electrical device and said first electrical device compares said test password to a password stored in an internal memory in said electrical key to determine if said test password and said password match up, and, if said test password and said password match up, then said electrical key transmits secret data from said internal memory in said electrical key.

41. The device of claim 40, further wherein if said test password and said password do not match up, then said electrical key transmits random information generated by a random number generator.

42. An authorization system, comprising:

a first connector having at least one pin and at least one internal electrical connection;

a second connector having said at least one pin and said at least one internal electrical connection, said first connector and said second connector electrically coupled via said at least one internal electrical connection of said first connector and said second connector, said first connector and said second connector housed in a common housing, said at least one pin of said first connector exposed externally from said common housing, said at least one pin of said second connector exposed externally from said common housing; and an electronic key having a first terminal selectively electrically coupled to a first internal electrical connection of said at least one internal electrical connection of said first connector and a second internal electrical connection of said at least one internal electrical connection of said first connector and a second terminal selectively electrically coupled to a third internal connection of said at least one internal electrical connection of said at least one internal electrical connection of said second connector; and control circuitry electrically coupled between said first internal electrical connection of said first connector and said second internal electrical connection of said first connector to regulate a flow of information between: said first internal electrical connection and said second internal electrical connection of said first connector via a one-wire signal interface established between said first terminal of said second electronic key and second terminals of said second electronic key, said first terminal of said second electronic key has a voltage level, said one-wire signal interface is implemented by holding said first terminal of said second electronic key to said first voltage level for said first time period, creating said transition between said first voltage level and said second voltage level, holding said first terminal to said second voltage level for said second time period, and selectively sampling said voltage level of said first terminal of said second electronic key to determine whether said data value is said first data value or said second data value at said first time, said data value a transferred via said one-wire signal interface comprises said at least one self-synchronized bit, said each self-synchronize bit of said at least one self-synchronized bit is independent of every other self-synchronized bit of said at least one self-synchronized bit.

43. The authorization system of claim 42, wherein said first connector is connected to a first electrical device and said second connector is connected to a second electrical device.

44. The authorization system of claim 43, wherein said first electrical device is a personal computer and said second electrical device is a printer and said at least one pin of said first connector plugs into a parallel port of said personal computer.

45. The authorization system of claim 42, wherein said first electrical device and said second electrical device conduct operations to transfer information between each other and said electronic key does not disturb said operations.

* * * * *

UNITED STATES PATENT AND TRADEMARK OFFICE
CERTIFICATE OF CORRECTION

PATENT NO. : 5,506,991  Page 1 of 5
DATED : April 9, 1996
INVENTOR(S) : Curry, Stephen M. et al.

It is certified that error appears in the above-indentified patent and that said Letters Patent is hereby corrected as shown below:

Title page,

Item [57], Abstract, line 7       Delete "the"

Column 1, line 32       Replace "is"
                            With --are--

Column 1, line 33       After "(DSC-303)"
                            Add a space

Column 1, line 62       After "metal"
                            Insert a period

Column 2, line 66       Replace "key ring"
                            With --keyring--

Column 3, line 60       After "embodiment."
                            Begin a new paragraph

Column 5, line 66       Replace "Data"
                            With --data--

UNITED STATES PATENT AND TRADEMARK OFFICE
CERTIFICATE OF CORRECTION

PATENT NO. : 5,506,991
DATED : April 9, 1996
INVENTOR(S) : Curry, Stephen M. et al.

It is certified that error appears in the above-indentified patent and that said Letters Patent is hereby corrected as shown below:

| | |
|---|---|
| Column 7, line 20 | Delete the space after "presence-" and before "detect" |
| Column 8, line 31 | Replace "Data" With --data-- |
| Column 9, line 1 | Replace "uniqure" With --unique-- |
| Column 9, line 5 | Replace "CROM" With --(ROM-- |
| Column 9, line 23 | Replace ")." With --.)-- |
| Column 9, line 62 | Delete the period after "following:" |
| Column 10, line 63 | Replace "feedbacklines" With --feedback lines-- |

UNITED STATES PATENT AND TRADEMARK OFFICE
CERTIFICATE OF CORRECTION

PATENT NO. : 5,506,991
DATED : April 9, 1996
INVENTOR(S) : Curry, Stephen M. et al.

It is certified that error appears in the above-indentified patent and that said Letters Patent is hereby corrected as shown below:

Column 11, line 28  After "requested" Insert a period

Column 12, line 14  Replace "IF" With --if--

Column 12, line 37  Replace "Interacing" With --Interfacing--

Column 12, lines 59-60  Delete "a first Schottky diode is connected between lines 14 and 13,"

Column 12, line 64  Replace "2915" With --2715--

Column 13, line 3  Replace "Coy" With --(by--

UNITED STATES PATENT AND TRADEMARK OFFICE
CERTIFICATE OF CORRECTION

PATENT NO. : 5,506,991
DATED : April 9, 1996
INVENTOR(S) : Curry, Stephen M. et al.

It is certified that error appears in the above-indentified patent and that said Letters Patent is hereby corrected as shown below:

In the Claims:

Column 13, line 56  Replace "fist"
With --first--

Column 13, line 62  Replace "firs"
With --first--

Column 14, line 51  Replace "claims"
With --claim--

Column 16, line 17  Replace "cormcorox"
With --connector--

Column 16, line 27  After "key"
Insert --to regulate a flow of information between said first terminal of said electronic key and said second terminal of said electronic key--

UNITED STATES PATENT AND TRADEMARK OFFICE
CERTIFICATE OF CORRECTION

PATENT NO. : 5,506,991
DATED : April 9, 1996
INVENTOR(S) : Curry, Stephen M. et al.

It is certified that error appears in the above-indentified patent and that said Letters Patent is hereby corrected as shown below:

Column 16, line 28   Replace "electron"
                        With --electronic--

Column 17, line 20   Replace "an"
                        With --and--

Column 17, line 40   Replace "bird"
                        With --third--

Column 17, line 46   Replace "self-synchronize"
                        With --self-synchronized--

Column 18, line 60   Delete "a"

Column 18, line 63   Replace "synchronize"
                        With --synchronized--

Signed and Sealed this

Seventeenth Day of December, 1996

Attest:

BRUCE LEHMAN

*Attesting Officer*   Commissioner of Patents and Trademarks